United States Patent [19]

Reinsch

[11] Patent Number: 5,083,313

[45] Date of Patent: Jan. 21, 1992

[54] VIDEO SIGNAL DIGITIZER

[76] Inventor: Roger A. Reinsch, 20663 Greenleaf Dr., Cupertino, Calif. 95014

[21] Appl. No.: 664,332

[22] Filed: Mar. 4, 1991

[51] Int. Cl.$^5$ ............................................. G06K 9/46
[52] U.S. Cl. ........................................ 382/8; 382/50; 358/442
[58] Field of Search ............... 382/8, 50, 68; 358/106, 358/107, 442, 444

[56] References Cited

U.S. PATENT DOCUMENTS

| | | | |
|---|---|---|---|
| 4,652,933 | 3/1987 | Koshiishi | 358/442 |
| 4,692,943 | 9/1987 | Pietzsch et al. | 382/8 |
| 4,827,349 | 5/1989 | Ogata et al. | 358/442 |
| 4,941,191 | 7/1990 | Miller et al. | 382/8 |

OTHER PUBLICATIONS

Lyman, *Shotshell Handbook*, 2nd Ed., p. 70.
Daley, John; *Pellets, The Radial Movements in a Pattern*, "Shotgun Sports" Magazine, Feb. 1990, pp. 22–25.
Hornandy, "Shotgun Patterning Instructions" 2 pages submitted describing commercially available patterning kit.
Advertisement for "Winchester Shotgun Pattern Sheets" as printed in Shotgun Sports Magazine, date unknown; p. 53.
Advertisement for "PatternRite's Patented Patterning Kits" as printed in Shotgun Sports Magazine, Mar. 1990; p. 93.
Lancaster, Charles; *The Art of Shooting*, 14th ed., 1985, p. 146.
Daley, John, *Choosing The Best*, "Shotgun Sports" Magazine Feb. 1990; pp. 16–19.
Baker, Stan, *Shotgun Pattern Testing*, "Shotgun Sports" Magazine Apr. 1986, pp. 41–42.
Daley, John, *Chokes, Ranges, and Pattern Spredd*, "Shotgun Sports" Magazine; May 1989, pp. 16–20.
Zutz, Don, *Full Chokes-Everyone's First Choice*, "Shotgun Sports" Magazine, May 1990; pp. 65–68.
Harris, Will, *28-Gauge Mistique;* "Shotgun Sports" Magazine Apr. 1990, pp. 44–46.
King, Sue, Ladies Only Please, "Shotgun Sports" Magazine June 1987, pp. 34–35.

*Primary Examiner*—Leo H. Boudreau
*Assistant Examiner*—David Fox
*Attorney, Agent, or Firm*—Jacques M. Dulin; Thomas C. Feix

[57] ABSTRACT

Video signal digitizer for processing scan line information representing image information from a video camera scanning a field of view having multiple images distributed therein. The digitizer defines by number digitizer stripes corresponding to image bright spots along a scan line, it tracks the scan lines by number and records the number of each video frame scan. The digitizer includes: analog process controller; event, scanning, state and queue controllers; event history recording memory; status display; an output queue device; and an I/O port. The digitizer can operate in bright-spot or edge-detection modes, and permits one-pass high resolution image verification, identification and location without edge matching or mosaic processing.

6 Claims, 18 Drawing Sheets

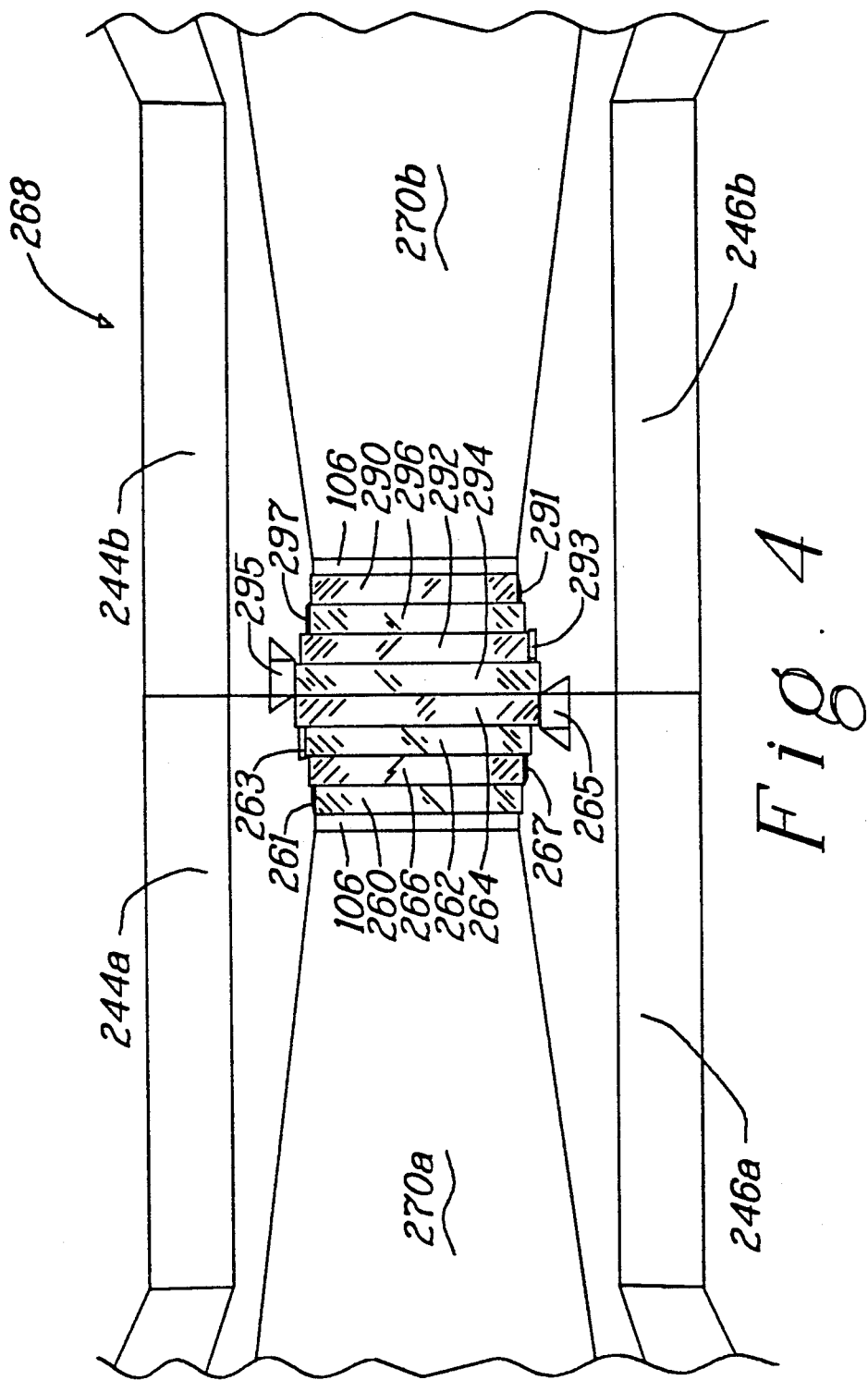

VIDEO SIGNAL DIGITIZER

CROSS REFERENCE TO RELATED APPLICATIONS

This application as filed contains the same disclosure as three other applications filed of even date hereof which claim subject matter, being: Ser. No. 07/664,361 filed Mar. 4, 1991, directed to apparatus and methods for analysis of target images; Ser. No. 664,364 filed Mar. 4, 1991, directed to apparatus and methods for image folding to change aspect ratio of a field of interest; and Ser. No. 664,337 filed Mar. 4, 1991, directed to computer programs for capture and analysis of digitized image data.

1. Field

This invention relates generally to apparatus systems and methods for image analysis, both patterns of distribution of target images and analysis of a high speed moving target image. The pattern analysis is described by way of example by reference to scanning targets containing holes created by shot propelled from a shotgun, and analysis to determine, for example, effectiveness of the shot load and/or choke by the pattern produced. More particularly, the invention relates to methods and apparatus for electronically scanning, counting and analyzing a wide variety of similar image bits (target images) scattered throughout a defined field area, e.g., the pattern of holes produced by shot holes from a shot gun blast on a target, star clusters, satellite photos of sites, vehicles, buildings, ships, animals, vegetation, gatherings of people or things, objects on a conveyor belt, etc., or in the case of high speed image motion, the movement of objects through a field of view, such as tennis line call detection, ballistics and the like.

2. Background

The drive to perfect the performance and efficiency of the shotgun has been relentless ever since the first multi-projectile weapon was fired centuries ago. It has long been recognized that by studying the pattern of a shotgun blast on a target (commonly referred to in the art as "patterning") much information can be revealed which helps the user in realizing the shotgun's full potential.

Patterning information, for example, can help explain how a shot load spreads in air, or how a barrel choke affects the shot under different load conditions. The patterning efficiency will vary depending on the velocity of the load and the type of load used. Moreover, other factors such as primer, powder, weight, shot, wad, size, etc. figure into the type of loads that may be used. Thus, the results of a patterning analysis are useful in order to find the best load for an individual's intended application, whether it be trap shooting, skeet shooting, sporting clay shooting or hunting.

The vast majority of patterning methods all rely on the use of paper targets with a 30 inch diameter circle drawn thereon and the labor intensive step of counting the number of pellet holes that are within that circle. This method has not changed substantially since the use of it referenced in the 1889 publication of shot spread and patterns reference tables compiled by the English shotgun master Charles Lancaster in his book entitled *The Art of Shooting*. These reference tables were compiled based on the results of numerous manual tests (i.e., shooting at targets and counting by eye the number of hits within the 30" circle). However, these reference tables only give modern day users a ballpark estimate of the percentages that they can expect as each gun barrel is unique, and pattern efficiencies will vary depending on the velocity of the load and the type of load used.

The importance of accurate and reliable patterning in order to discover the individual performance quirks of one's shotgun is not lost on modern day shotgun enthusiasts. Indeed, the shotgun literature is replete with articles on how patterning analysis will improve a shotgunner's performance. See, for example, the following articles from Shotgun Sports magazine: (1) "Choosing the Best" by John Daley (Feb. 1989); (2) "Shotgun Patterns—How and Why" by Stan Baker (April 1986); (3) "Chokes, Ranges, and Pattern Spread" by John Daley (May 1989); (4) "Full Chokes—Everyone's First Choice" by Don Zutz (May 1990); (5) "28-Gauge Mistique" by Will Harris (April 1990); and (6) "Ladies Only Please" by Sue King (June 1987).

All of the above mentioned references disclose the same conventional patterning technique of manually drawing and centering (by eye) a 30 inch diameter circle about the heavily clustered group of shothole marks in a paper target. The shooter then counts by hand the number of holes within the circle. This number is then compared to a listed pellet count to determine the spread percentage within the 30 inch diameter circle.

Another example of a manual patterning technique is disclosed in the Lyman Shotshell Handbook (2nd edition), wherein the shooter draws a 30 inch diameter circle on a brown sheet of wrapping paper and the center is marked prior to shooting. The sheet is suspended between two poles and is used as the target for the shooter. As in prior techniques, the user manually counts by hand the number of shot holes that hit the target to determine the pattern. The shooter is required to do five of such patterns to get an accurate analysis of the shotgun spread.

Both variations of the above patterning techniques of presenting the 30" reference circle on the target (i.e., by drawing it on the target prior to shooting or centering it about a heavily clustered group of shot hole marks on the target after shooting) still require the labor intensive step of counting the shot hole marks.

Other manual methods of patterning include drawing several smaller diameter circles within the standard 30 inch diameter circle of a paper target. Division into smaller annular rings provides more information to the shooter on radial pellet distribution and density. Such a radial pellet method is disclosed in Shotgun sports magazine, "Pattern Quirks—Radial Pellet Movement" by John Daley (Feb. 1990).

The Hornady Company of Grand Island, Nebraska teaches to segment a traditional 30 inch circle in a 12 cell pattern through their commercially available pattern sheets. The cells (or quadrants) assist the shooter in determining the point of aim of the shotgun after manually counting the shot holes on each quadrant.

Other examples of manual techniques for patterning shotgun blasts include the commercially available Winchester Shotgun Pattern Sheets (available for many years), and the PatternRite System supplied by PatternRite of Miami, Okla., which is claimed to be patented. The Winchester Shotgun Pattern Sheets teach to use a series of 30 inch circles. Each circle is superimposed on the other circles and each circle is slightly off center with respect to the other circles. This facilitates the centering of the shotgun pattern before hand counting is commenced. The PatternRite System provides a collapsible steel stand and backboard wherein 50 preprinted paper pattern sheets are provided to be used with the backboard, each sheet having a preprinted actual size target in the shape of a game bird.

As can be seen from the above references, the patterning and analysis techniques for studying shotgun blasts are manual and have not changed or advanced significantly since their inception. The tedious steps of manually counting and marking each shothole on a paper target is repeated in each patterning technique. Thus, there is a definite need for a patterning and analysis system which eliminates the manual step of counting, centering and analyzing the shotgun pattern on a paper target.

THE INVENTION

Objects

It is among the objects of this invention to provide methods and apparatus for automating the process of image scanning and analysis previously performed manually, in order to simplify this otherwise labor intensive activity and to increase the accuracy of those analyses.

It is another object of this invention to provide methods and apparatus for an automated system that precisely locates the center of a pattern of images in the target area or field, and accurately counts the number such images in each defined area or field.

It is another object of this invention to employ the system and method of this invention for shotgun pattern analysis.

It is another object of this invention to provide methods and apparatus for an automated system that performs shotgun pattern analyses of several types, and correlates the gathered data to determine the best operating conditions for the shotgun, choke and load combination.

It is another object of this invention to provide methods and apparatus for an automated system that performs additional shotgun pattern analysis by presenting the results in a report format including overlays and side by side charts so that systematic and consistent errors of the shooter or variations in pattern densities in a family of targets can be detected.

It is another object of this invention to provide methods and apparatus for scanning shotgun targets, or other distributions of images in (a) pattern(s), using special imaging analysis techniques whereby the analysis provides for the determination of the size of a circle which contains an arbitrary percent of the images, e.g. shot holes, determines the density of images, e.g. holes, in any selected target field area viewed for any cell size desired, and inspects this density information to identify patterns, such as image (hole) clusters or gaps.

It is yet another object of this invention to provide methods and apparatus for scanning shotgun or other patterns (distribution of images) using special imaging analysis techniques whereby the distance from the center of the image pattern to any chosen image (hole) or distribution density of images (holes) is determined.

Still other objects will be evident from the summary, drawings detailed specification and claims which follows.

Drawings -

The invention is illustrated in the drawings, in which:

FIG. 4 is a perspective view of the entire mirror and mirror support assembly of the image folding apparatus as seen by the camera;

FIGS. 12, 13, 14, 15, and 16 are examples of hardcopy printouts of the image analysis in accord with the invention having various legends and analytic notations thereon.

SUMMARY

The invention comprises apparatus and methods for scanning fields to precisely locate images therein, identification of images, analysis of images identified to determine image distribution patterns and generation of reports relating to the image patterns detected. The invention is described in detail with reference to scanning targets containing holes created by shot propelled from a shotgun and analysis apparatuses and methods used to determine effectiveness of the pattern produced. This is accomplished by wrapping a target (representing a field of view having multiple images of similar objects or events distributed therein) to be analyzed around a transparent drum which is illuminated from the inside, rotating the drum in front of the objective aperture of an image folding apparatus (the objective aperture being a high aspect ratio slit which permits sequential display of adjacent portions of the field), and the image folding apparatus optically orienting the slit into a series of adjacent overlapping zones or slices, scanning the moving target (sequential field portions)

with a video camera through the image folding apparatus to produce a signal, digitizing the signal, electronically processing the signal produced by the video camera to identify the bright areas (holes) corresponding to the position of the images in each zone of the field; processing this bright area (image) information with a series of computer programs to determine exactly where the holes are (image positioning), computer processing the positions of the holes (image positions) information to identify patterns and to produce reports which describe the characteristics of the shot patterns (image distribution patterns) detected.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

The invention will be described by way of illustration with reference to analysis of shotgun shot patterns, but it should be understood that any scannable images, not just shot holes in a target, may be analyzed, such as astronomical objects (stars, galaxies, gas), biological objects (bacterial cultures), inventory, aerial photography analysis of mineral deposits or vegetation, wild or domestic animal distribution, traffic density, military objects, etc.

Figure 1:
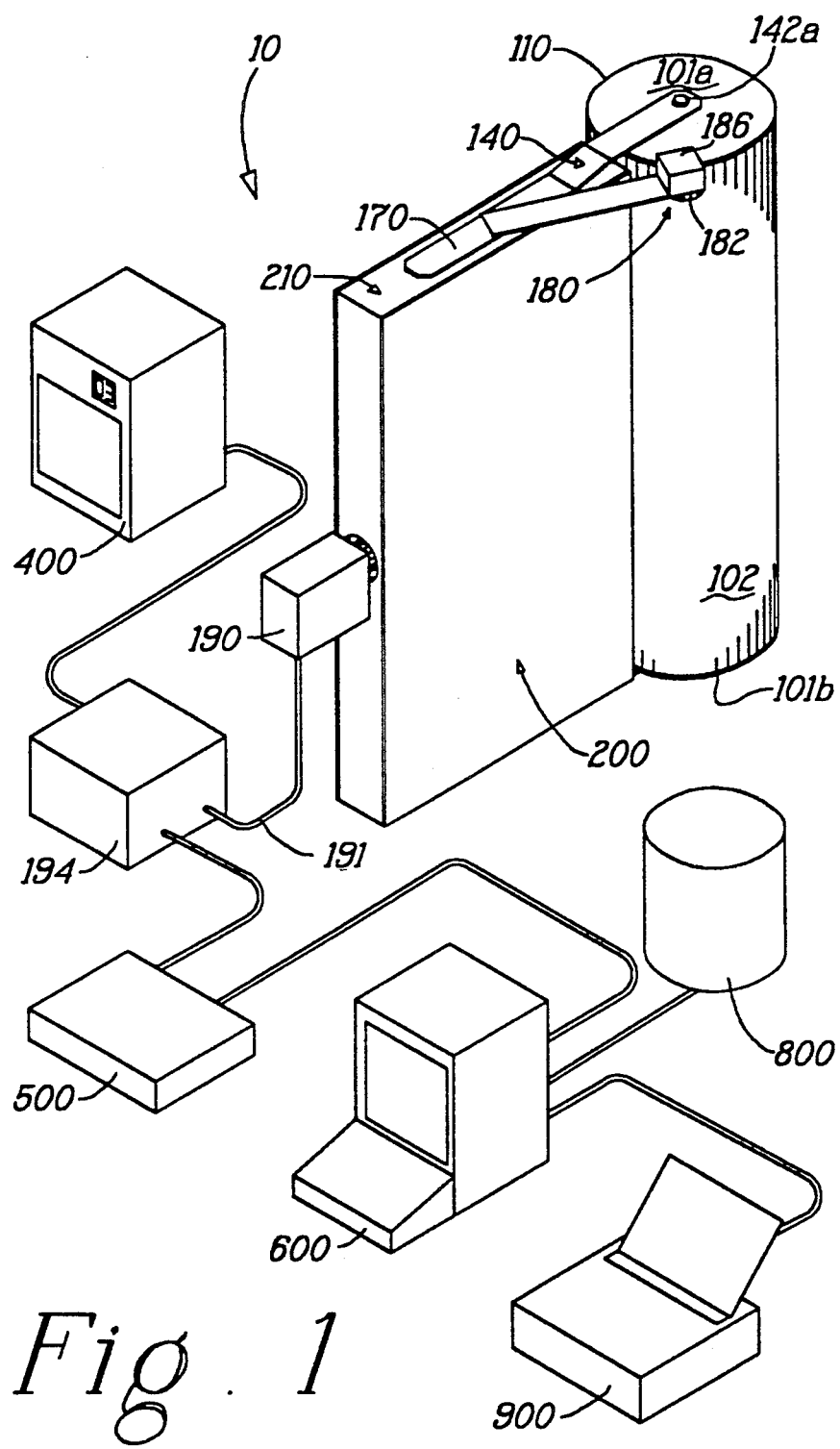
FIG. 1 shows an isometric view of the components of the automated pattern analysis system of the invention.

An automated shotgun pattern scanning and analysis system constructed in accordance with one embodiment of the present invention is indicated generally by the reference numeral 10 in FIG. 1. The system 10 comprises two interrelated component parts including the scanning component and the analyzing component. The scanning component generally comprises a video camera 190, image folding apparatus 200 and target illumination drum 110. The video camera 190, being disposed at one end of the image folding apparatus 200, records the images of an illuminated paper target (image) wrapped around the target illumination drum 110 while the drum (and target) is caused to rotate in front of an aperture disposed at the opposite end of the image folding apparatus 200.

The analysis components generally comprise a recording and conversion device 194, a capture monitor 400, a video signal digitizer 500, a computer 600, an external storage memory 800 and a printer 900. The image signal generated by the camera 190 passes via cable 191 to the recording and conversion device 194 which simultaneously causes the signal to be displayed on the capture monitor 400 and to be digitized by the video signal digitizer 500. The computer 600 then manipulates this digital information and stores it on the storage memory 800. It can also produce graphic displays on the screen of computer 600, and/or hard copy printouts of the shot pattern analysis through means of the printer 900. By printer is meant any device for producing hard copy information of the target images detected and located in the scanned field, such as a printer, plotter, video printer, camera (CCD or film type), etc.

Referring now to both FIGS. 1 and 2, the target illumination drum 110 (hereinafter "drum") comprises thin flexible sheet of transparent or translucent material, such as lexan, which is formed into a cylinder 102 and is supported by top and bottom circular end faces 101a, 101b. The drum 110 is rotatably supported at each end on bearing means 160a and 160b which are disposed to support the center point of the top and bottom circular end faces 101a, 101b thus permitting axial rotation of the drum 110 about an axis y—y, which may be vertical as in FIG. 1, or horizontal as in FIG. 2. The bearings 160a and 160b are part of bracket assemblies 140a and 140b which further comprises attachment bolts 142a and 142b, and brackets 170a and 170b. The bracket assemblies 140a and 140b firmly attach the rotatable drum 110 to the rigid framework 210 of the image folding apparatus 200.

The rigid framework 210 also has along its vertical side 104 a video camera 190 incorporated therein and which is adapted to record images that pass by an elongated slit-type aperture 214 (see FIG. 3) disposed centrally along substantially the entire length of opposing vertical side 106.

A lighting apparatus consisting of a lamp support 154 and a lamp 150 is disposed within the drum 110 and is axially aligned with and firmly held within the drum 110 by bolts 142a and 142b. The lamp 150 is oriented to illuminate the rotating drum side wall 102 as it passes by aperture 214. In the preferred embodiment for the invention the aperture 214 is 1 inch wide by 48 inches long and the lamp is a standard fluorescent light fixture. The lamp 150 and drum 110 are mounted in a fixed relationship with respect to the image folding apparatus 200 by means of the bracket assembly 140a and 140b.

The field to be viewed, e.g., a target is placed on the drum. As the drum is rotated uniformly, the slit in cooperation with the relative motion creates a plurality of high aspect ratio portions of the field that are disposed adjacent each other. The converse may also be done, that is, fix the field and move the slit in a uniform manner.

The image folding apparatus 200 serves to change the aspect ratio by dividing the images that the camera 190 views through aperture 214 into eight zones which overlap a bit (e.g., 1/16" to ⅛") at their contiguous ends. The divisions are transverse to the axis of the drum, which in FIGS. 1 and 3 will be horizontal. The longitudinal axis of each zone is thus parallel to the longitudinal axis of the drum and slit. In FIG. 2 these eight overlapping zones correspond to zones 120, 136, 122, 134, 124, 132, 126 and 130 along the drum 110. As the drum 110 is axially rotated by a transport motor 180 comprising a drive motor 186 and a drive wheel 182, the entire surface area of each zone passes in front of an equivalent zone of the image folding apparatus 200. Thus, for a complete revolution of drum 110, the camera will see the cylindrical surface areas of zones 120, 136, 122, 134, 124, 132, 126 and 130 of the drum 110. At all times the transport motor 180 is mounted in a fixed relationship to the drum 110 by support bracket 184.

IMAGE FOLDING APPARATUS

Figure 3:
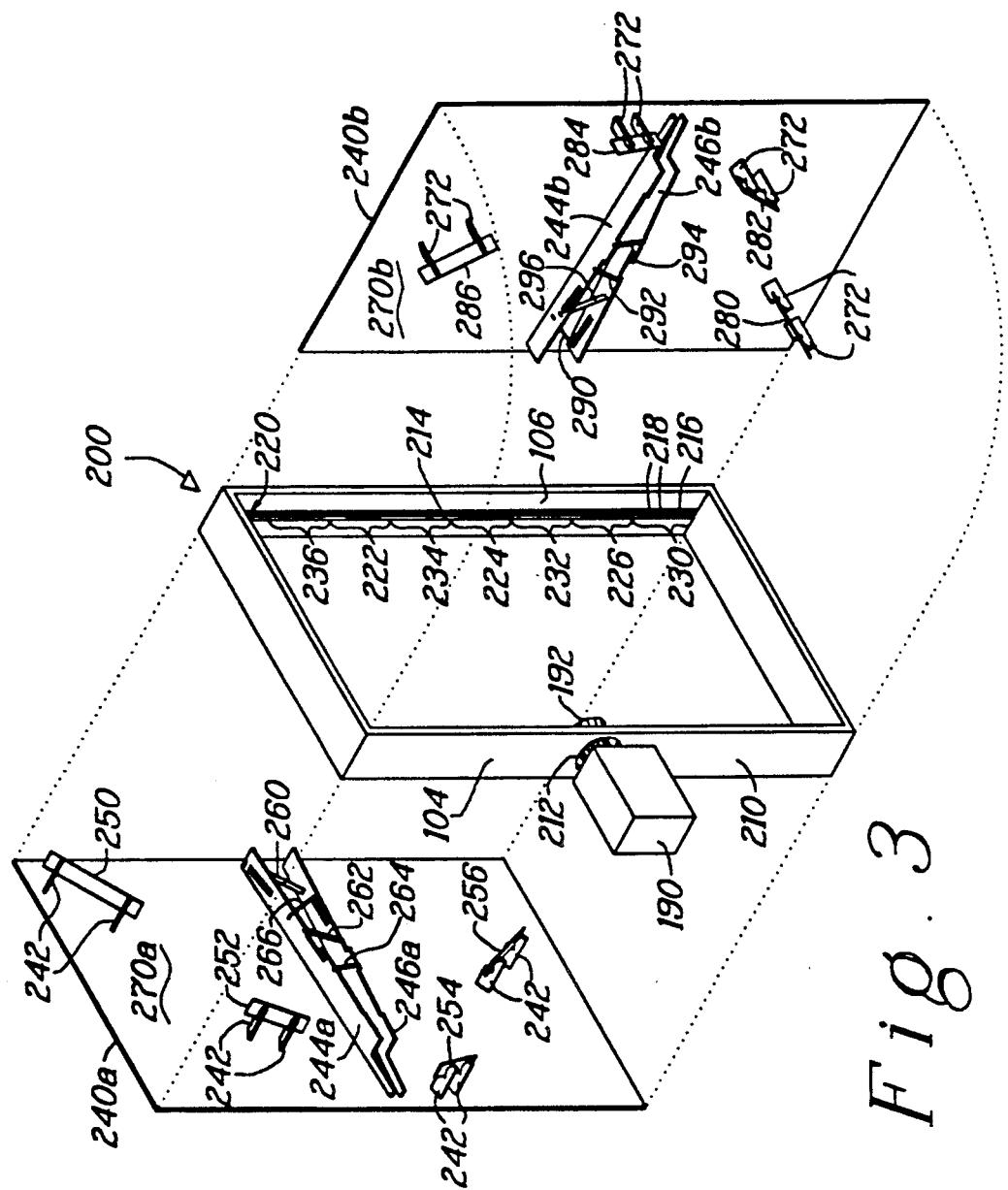
FIG. 3 is an isometric exploded view of the image folding apparatus showing the right side panel of the image folding apparatus rotated 90 degrees about its vertical axis at one corner.

As is best seen in FIG. 3, the image folding apparatus 200 has a rigid rectangular framework 210, a left side member 240a and a right side member 240b which attach to the framework 210 to form a box-like enclosure.

The framework 210 includes a hole 212 disposed centrally through the face of and midway along vertical side 104. The lens of camera 190 is inserted within hole 212 to permit viewing through a pathway of mirrors inside. In the preferred embodiment the lens of the camera 192 protrudes through the hole 212 to reach the optical center of the mirror array.

The framework 210 also includes the slit-like aperture 214 along its vertical side 106 to permit light emanating from the lamp 150 that is projected through the translucent (or transparent) side wall 102 of rotating drum 110 and the paper target wrapped therearound to reach the mirrors inside. Aperture 214 includes a plastic or glass insert, which includes a medially positioned longitudinal capture zone 216 (parallel to the axis of the drum) which is flanked by two outwardly adjacent guard zones 218, one on each side of medial capture zone 216. To maximize or enhance contrast, the capture zone 216 has a light blue tint and the guard zones 218 have a deep red tint. As mentioned above, the aperture 214 is divided into eight vertically stacked and overlapping zones 220, 236, 222, 234, 224, 232, 226, 230 corresponding to the eight target image zones of FIG. 2.

The inside face 270a of left side member 240a has positioned thereon four primary mirrors 250, 252, 254, 256 attached via supports 242, and four secondary mirrors 260, 266, 262, 264 attached via upper and lower supports 244a and 246a, respectively.

Similarly, the inside face 270b of right side member 240b has positioned thereon four primary mirrors 280, 282, 284, 286 attached via supports 272, and four secondary mirrors 290, 296, 292, 294 attached via supports 244b and 246b.

Both sets of mirrors (primary and secondary) provided along each inside face 270a and 270b cooperate to form a mirror pathway which will be discussed in greater detail below with reference to FIG. 4.

In addition, all of the mirrors are placed so that the sum of the distances from a particular target zone to a particular primary mirror and to the corresponding secondary mirror and to the camera lens is the same for all zones. This allows the camera to focus clearly on all zones simultaneously. For example, if the camera is set for a focus distance of six feet, then the distance from target zone 120 to its corresponding primary mirror 250 to its corresponding secondary mirror 260 to the camera lens 192 is exactly six feet. The secondary mirrors are set at different distances from the camera lens and alternately face upwardly and downwardly to avoid blocking the image which should fall on another secondary mirror and to avoid picking up false images from adjoining mirrors.

While the image folding apparatus 200 of this invention is disclosed as having a particular arrangement of a plurality of primary and secondary mirrors as seen in FIGS. 3 and 4, it is understood that any number of mirrors may be added to or deleted from the image folding apparatus 200 without detracting from the effectiveness of the invention. The present number of mirrors permits the simultaneous bending of the light paths of eight (8) image zones which are vertically spread, end to end, and sequenced, into the lens of a medially placed camera which is aimed along a midpoint of the longitudinal axis of the image zones (which axis may be vertical or horizontal depending on the orientation of the drum) and spaced a certain lateral distance away (in this case roughly 30-40 inches).

In other words, the field viewing aperture (slit), which is 48 inches long by 1 inch wide (that is, when viewed with the drum slit axis vertical as in FIG. 1 Would be a strip 48" high by 1" wide a 48:1 aspect ratio), is folded (stacked) into eight segments (placed side by side) each 6 inches high, which are oriented for display vertically on the monitor. They thus are transformed into 8 segments 6 inches high, an aggregate 6:8 aspect ratio, aspect ratio being height:width. Thus, the number of mirrors determines the change in aspect ratio which is achieved by the folding. An 8:1 change in aspect ratio is achieved by using the eight mirror pairs of the preferred embodiment of this invention. This ratio, 6:8 (or 3:4), is exactly the ratio of the height to width of the standard TV picture. Since the capture zone longitudinal axis is perpendicular to the horizontal direction of the scan lines and to the motion of the target image through the zone, the scan line vertical spacing to be employed to achieve fine resolution.

Alternately the aperture may also be divided into six segments, each segment 8 inches long, in order to accomplish the same fit to a standard TV picture with 6:1 change in aspect ratio. In this case the capture zones and guard zones are oriented horizontally on the TV screen; i.e., the image 401 in FIG. 5b would be rotated 90° although the monitor stays as is. That is easily accomplished by rotating the The equivalent ratio for the emerging HDTV standards is 5:3 (or 3:5 when rotated 90°) to accommodate modern movie film format. We prefer the high aspect ratio to be above about 10:1 and preferably above about 20:1, with the aggregate aspect ratios below 5 and preferably below about 2.

It is important to understand that by appropriate orientation of the camera to provide either horizontal apparent motion of the target image parallel to the NTSC scan line, or perpendicular thereto (apparent vertical motion of the target image) the apparatus system and method of this invention can be used either for pattern analysis (target image motion parallel to NTSC scan lines) or for high speed motion analysis (target image motion perpendicular to NTSC scan lines; vertical on the monitor screen).

The parallel motion arrangement is the best mode for utilizing the scan line spacing to get fine resolution of the target image since it intercepts more closely spaced scan lines increasing resolution.

Conversely, the perpendicular motion arrangement is the best mode for high speed object analysis since the apparent frame or field rate of the video image can be increased. For example, with an 8:6 aspect ratio (video camera 190 turned 90° with 6 mirror pairs all aligned to view the same field), 360 fields will be scanned each second. Thus, the position of an object moving through the field is more precisely locatable. This arrangement would be particularly suitable in the case, for example, where the system of the invention is used for line judging in tennis, with the slit oriented parallel to a line. Whether the ball is "in" or "out" can be more precisely detectable since one gets 360 fields (looks or views) per second, compared to the ordinary 60. Likewise, other fast moving objects can be tracked in a field by the system oriented for the transverse (vertical) motion.

It should also be understood that single primary and secondary mirrors may be used to replace the cooperating left and right side primary and secondary mirror pairs of this invention. For example, right side primary mirror 250 and its corresponding left side primary mirror 286 may be formed into one single mirror having a viewing width dimension equal to the combination of both individual mirrors, 250 and 286.

FIG. 4 shows a camera's eye (perspective) view of the secondary mirror array 268 of FIG. 3 as seen by the camera when the image folding apparatus 200 is assembled (i.e., when both left side member 240a and right side member 240b ar joined together with the frame 210). The top and bottom portions of this perspective view are delineated by the upper and lower secondary mirrors supports 244a, 244b and 246a, 246b, respectively. The left and right side of the figure are delineated by the left and right inside faces 270a and 270b of side members 240a, 240b. The center portion of FIG. 4 shows the eight secondary mirrors 260, 266, 262, 264, 294, 292, 296, 290 as they are seen by the camera 190. A small portion of the vertical side 106 of framework 210 is visible along the outer side edges of the secondary mirror array 262. Also visible are upper windows 261, 263, 295, 297 and lower windows 267, 265, 293, 291. Light emanated from the lamp 150 is reflected from the primary mirrors, passes through windows between the primary and secondary mirror arrays and is directed to the camera lens by the secondary mirrors.

Figure 2:
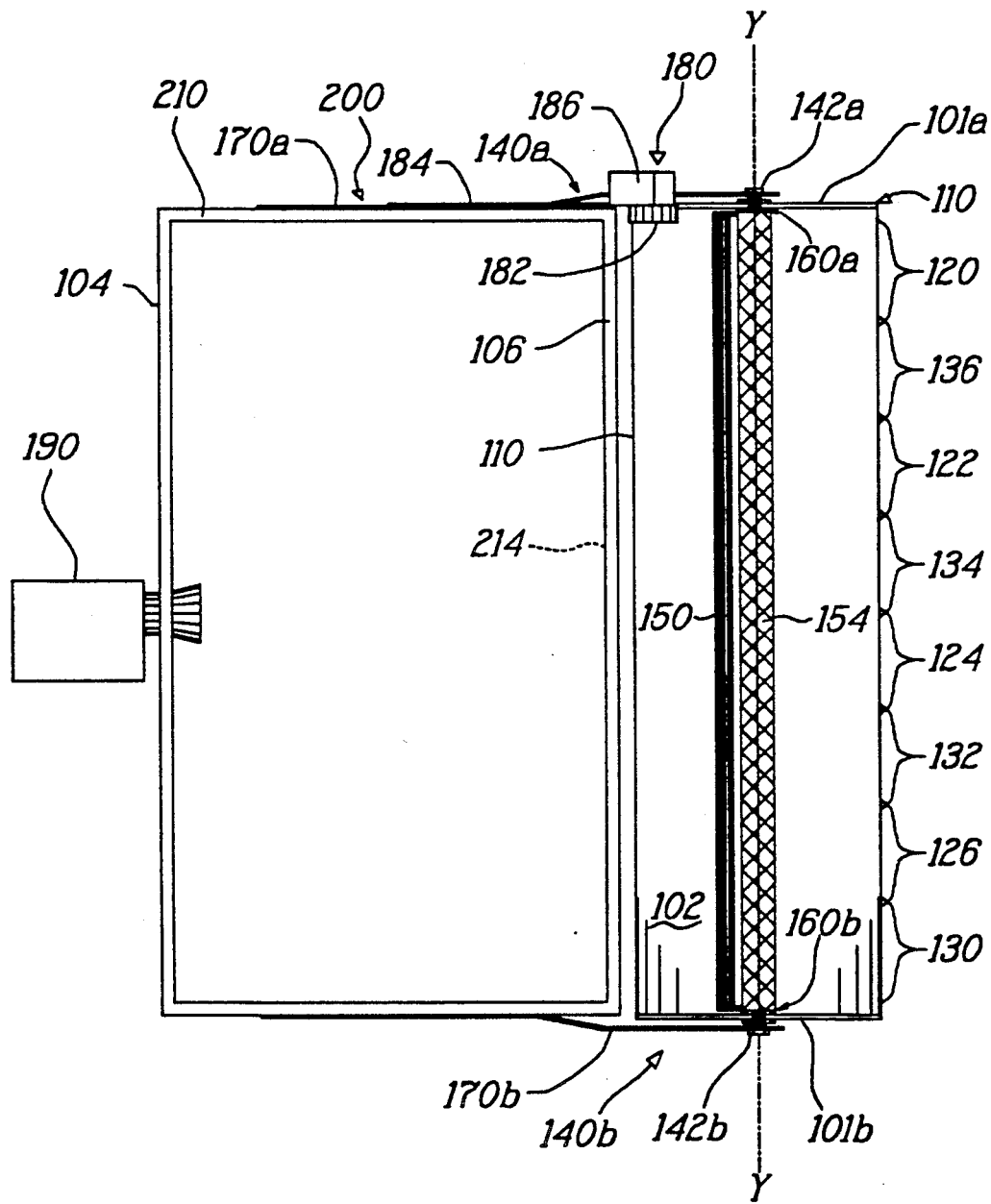
FIG. 2 is a side elevation or plan view of image folding apparatus and target illumination drum with the right and left side panels of the image folding apparatus removed and showing the camera oriented in the box frame to view targets that are wrapped around the illumination drum.

During operation, the camera 190 is zoomed to include only the secondary mirror area and is focused on the eight target zones 120, 136, 122, 134, 124, 132, 126, and 130 of FIG. 2.

IMAGE FOLDING OPERATION

Figure 5A:
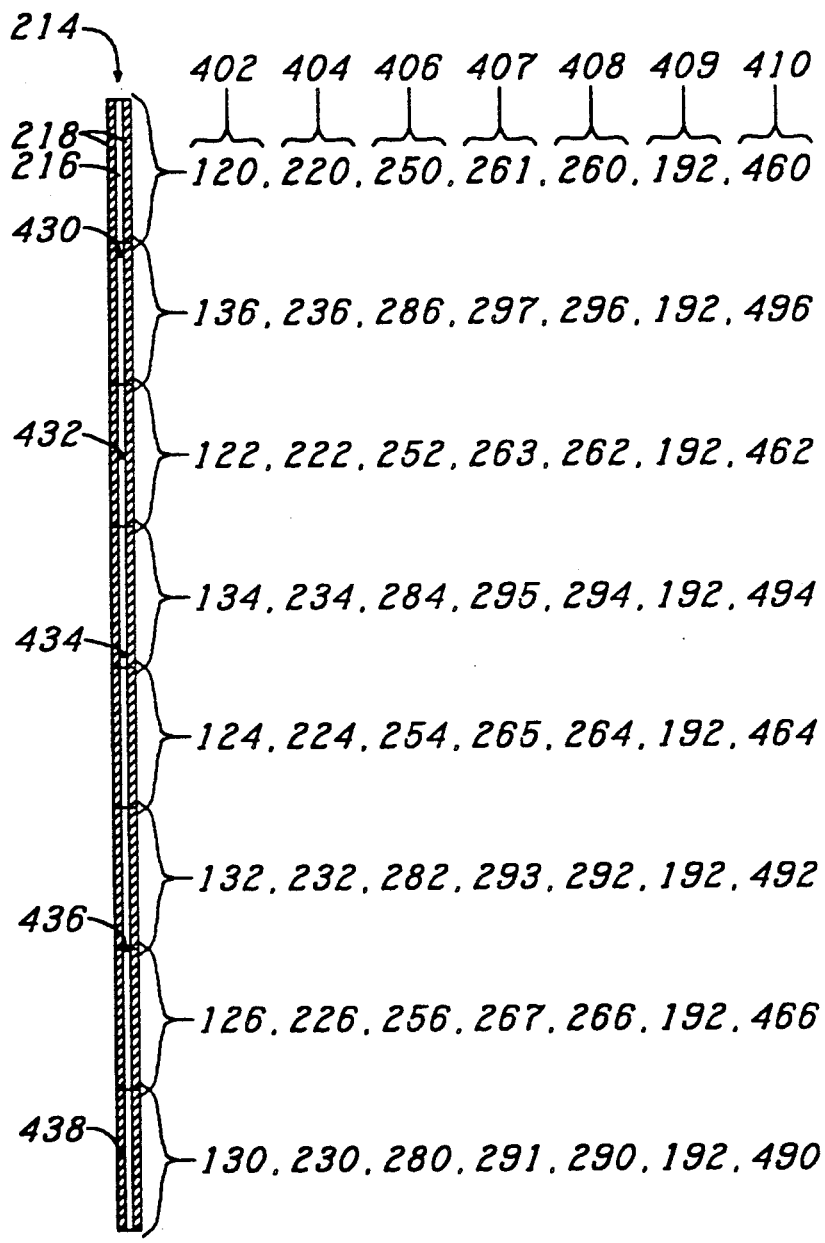
FIG. 5a is a front elevation view of the object aperture area of the image folding apparatus of FIG. 3 showing eight overlapping zones and line of sight indications for each zone.

The detail of aperture 214 and an enumeration of the path that light takes to get to the camera 190 are best seen in FIG. 5a. FIGS. 5a and 4 show the aperture (slit) 214 including the capture zone 216 and guard zones 218. The seven columns of numbers identified as 402, 404, 406, 407, 408, 409 and 410 represent the zones, windows, and mirrors (both secondary and primary) that a ray of light will strike or pass through while traveling from the lamp 150 of FIG. 2 to the camera 190 of FIGS. 2 and 3. In other words, the reference numbers to the right of the aperture 214 enumerate the path light takes from target to image and thus illustrate the folding of the field portion visible through the slit which has occurred.

The first column of numbers 402 represents the overlapping target Zone numbers 120, 136, 122, 134, 124, 132, 126, and 130 from the side wall 102 of rotating drum 110 of FIG. 2. The second column of numbers 404 represents the overlapping aperture zones 220, 236, 222, 234, 224, 232, 226, and 230 disposed along the aperture (slit) 214 originally described in FIG. 3 and repeated here. The third column of numbers 406 represents the primary mirror references 250, 286, 252, 284, 254, 282, 256, and 280 from FIGS. 3 and 4. The fourth column of numbers 407 represents the window references 261, 297, 263, 295, 265, 293, 267 and 291 from FIG. 4. The fifth column of numbers 408 represents the secondary mirror references 260, 296, 262, 294, 264, 292, 266, and 290 from FIG. 3. The sixth column 409 represents the convergence of all of these paths on the camera lens 192 from FIG. 3. The seventh and final column 410 represents aperture stripe references 460, 496, 462, 494, 464, 492, 466, and 490 whereby the eight aperture stripes form an image that corresponds to the image reflected on the secondary mirrors 260, 266, 262, 264, 294, 296, and 290. The aperture stripe references show where each zone is captured by the video camera. The aperture stripes each include sub-zones, here two guard zones flanking a capture zone. This will be discussed in greater detail below with reference to FIG. 5b.

Referring back to FIG. 5a, five target object images (also called "objects") 430, 432, 434, 436, 438 are shown disposed in different areas along aperture 214. Each target object image represents a shot hole in the paper target (or other image, e.g. star in a photo emulsion) that has been wrapped around the illuminated target drum. As the drum (and target) rotates in front of the aperture 214 of the image folding apparatus, light from inside the drum passes through the shot holes and is viewed by the video camera via the mirror arrays. At any instant in time the locations of each target object image is generally identified by reference to the zone of the aperture 214 in which it appears, in both the horizontal and vertical position (or directions). For example, target object 430 is located in the capture zone 216 (horizontal component) and at the top of target zone 136 (vertical component). Note, the vertical component for target zone 136 may also be referred to as aperture 236, primary mirror reference 286, window reference 297, secondary mirror reference 296 or aperture stripe reference 496.

The location of the remaining four target objects are as follows. Target object 432 is at capture zone 216 and at the middle of target zone 122. Target object 434 is at capture zone 216 and at the bottom of target zone 134. Object 436 is at capture zone 216 and in the overlap area between target zones 132, 126 and Will show on two aperture stripes 466, 492 (see FIG. 5b). Object 438 is in a guard zone 218 and in the middle of target zone 130.

All target object images that are in the capture zone 216 will show up on at least one aperture stripe. Thus, target objects 430, 432, and 434 are visible singly on aperture stripes 496, 462, and 494, respectively. Since target object 436 lies in the capture zone 216 and falls within the overlap of two target zones 132 and 126 it is visible on two aperture stripes 492 and 466 (see also FIG. 5b). Target object image 438 is not visible in any capture zone of any aperture stripe since it falls in a guard zone 218. In other words, target object 438 will not be detected.

Figure 5B:
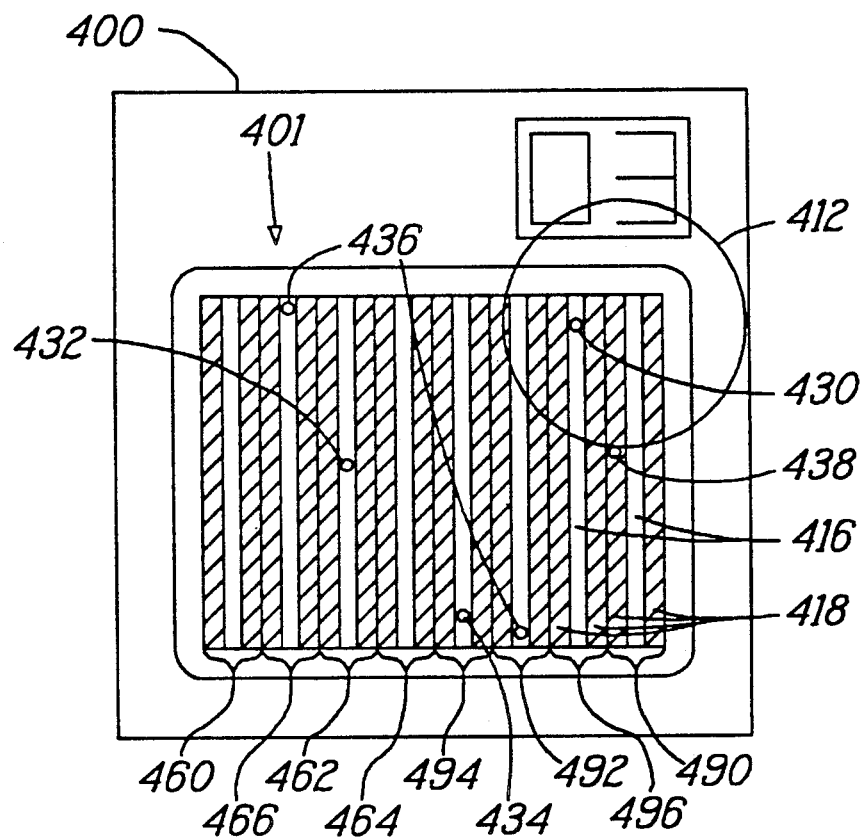
FIG. 5b is a front elevation view of a capture monitor screen showing the mapping of image holes from the target to the video image through folding, with a circular area superimposed on the upper right corner of the screen.

FIG. 5b illustrates the result of "image folding" and shows the capture monitor 400 displaying the image 401 as seen by the camera 190. The image shows eight aperture stripes 46, 466, 462, 464, 494, 492, 496, 490 (and their guard and capture zones), corresponding to the image reflected on the secondary mirrors 260, 266, 262, 264, 294, 292, 296, 290. Capture zones 416 of FIG. 5b are the images of the aperture zone 216 of FIG. 5a divided into eight aperture stripes. This division into eight parts and adjacent stacking is what is referred to by this description as "image folding". Accordingly, the capture zone 416 and guard zones 418 of FIG. 5b are the folded images of the capture zone 216 and guard zones 218 of FIG. 5a.

Just as in the above description with reference to FIG. 5a, the five target object images 430, 432, 434, 436, 438 are shown in the folded image of FIG. 5b. As before, target object 430 is at the top of a zone 496. Target object 432 is in the center 462. Target object 434 is at the bottom 494. These target objects 430, 432, 434 are visible on only one aperture stripe, ie., aperture stripes 496, 462, and 494, respectively. They are in the (now folded) capture zone 416 (which is the unfolded capture zone 216 of FIG. 5a). Target object 436 is in the overlap area between target zones 132, 126 and shows on two aperture stripes 466, 492. Target object 438 is in the (now folded) guard zone 418 of aperture stripe 490 and will not be detected.

Figure 5C:
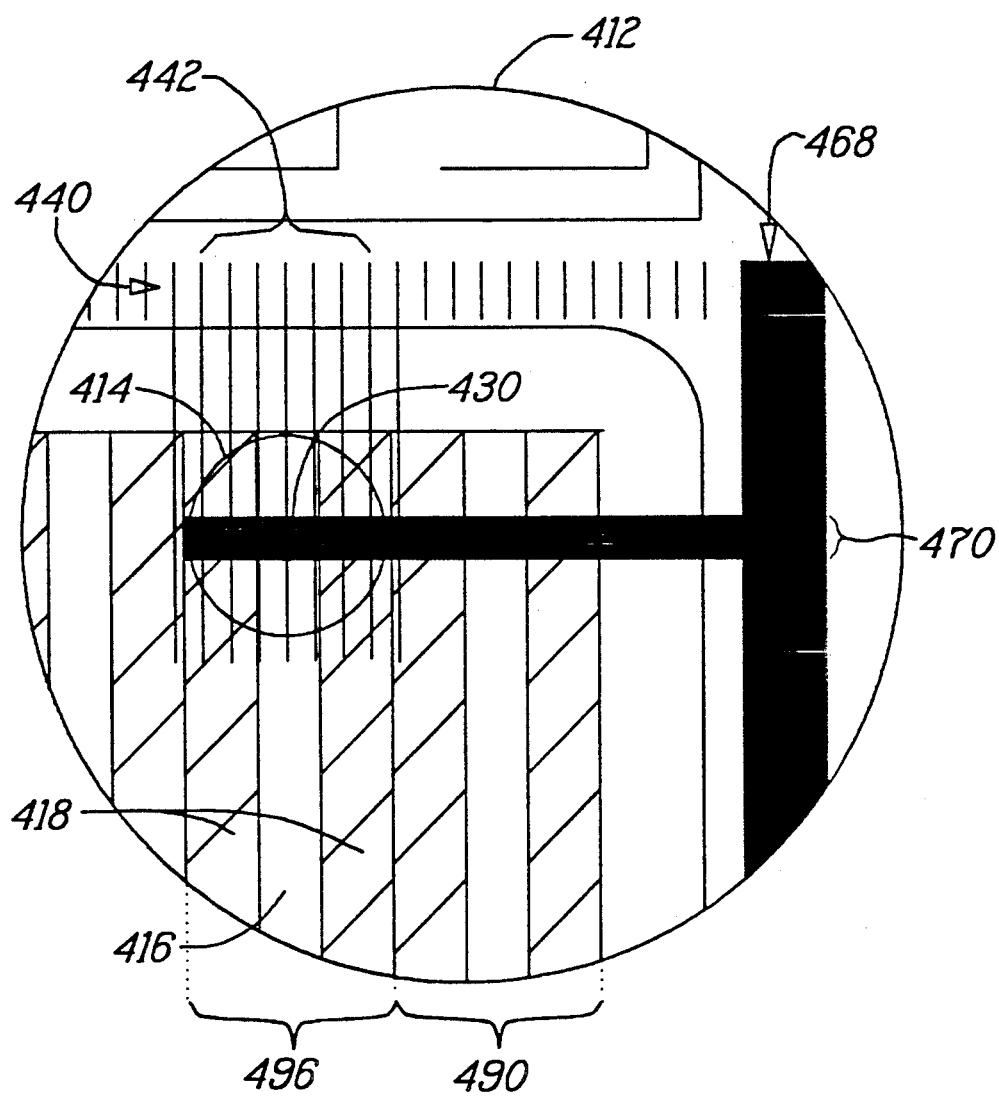
FIG. 5c is an enlarged view of the circular area of FIG. 5b showing the details of aperture stripe and scan line relationships to the image and a smaller circular area superimposed on an identified target image hole.

Referring now to FIG. 5c, the circular border (or circled area) 412 is an enlargement of the circled area 412 on the upper right hand corner of the screen area on the capture monitor 400 of FIG. 5b. The vertical column of horizontal lines 468 represents the scan lines of the video system. In the preferred embodiment of the invention, the horizontal lines are defined by NTSC (National Television System Committee) standards which require 525 scan lines to complete the image. However, it is understood that any set of standards may be specified for use with the present invention, as the underlying principle of the invention is the same for all systems. For example, if the currently adopted European standard, PAL (Phase Alternation Line) is specified, there are 625 scan lines, and if the old or obsolete French broadcast color television standard, SECAM (Systeme Electronique Couleur avec Memoire) is specified, there are 819 scan lines used to complete the image. The emerging HDTV standards call for scan lines in excess of 1,000.

The set of lines 470, all of which horizontally extend beyond the vertical column of horizontal lines 468 to cover the target object 430, is further bounded by circle 414. Circle 414 represents the next level of enlargement of an area on the capture monitor screen and is shown in greater detail in FIG. 5d.

Continuing with reference to FIG. 5c, the vertical lines 440 represent the digitizer stripes produced by the digitizing circuitry of the video signal digitizer 500. The logic for the digitizing circuitry will be discussed in detail with reference to FIG. 6. In the preferred embodiment, there are 63 digitizer stripes. The set of digitizer stripes 442 which cover the next level of detail are extended to go through circle 414.

Figure 5D:
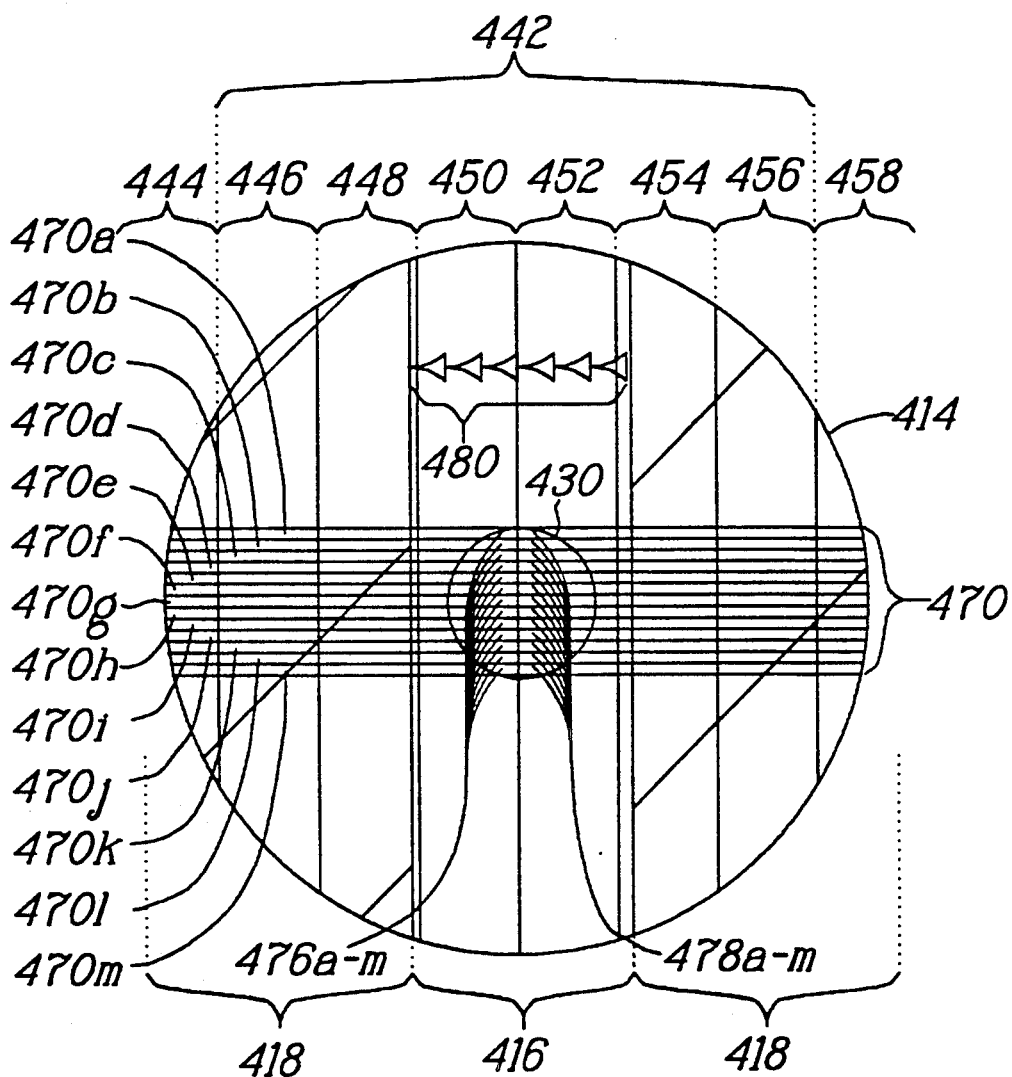
FIG. 5d is an enlarged view of the smaller circular area of FIG. 5c showing further detail of the aperture stripe and scan line relations to the image.

Circle 414 encloses one set of the single capture zone 416 and adjacent guard zones 418. The guard zones 418 are wide enough to allow significant mis-alignment of the mirror assembly before ambiguous results occur. Adjacent guard zones 418 from a neighboring set configurations (e.g. 490 or 492) can completely overlap with no loss of information content in the video image. The exact alignment of the digitizer stripes to the capture zone also varies considerably. Each capture zone in this figure is covered by one or two full width digitizer stripes and two partial width digitizer stripes. However, it is understood that depending on the amount of zoom used, the actual number of digitizer stripes covered could be more or less;

Referring now to FIG. 5d, the circled area 414, an enlarged version of the circled area 414 of FIG. 5c, shows all the digitizer stripes and scan lines of interest for detecting the target object 430. As is shown in this example, digitizer stripes 444, 446, 456, 458 are completely in the guard zones 418. They will not signal a hit to the digitizer, even when object 430 passes into those zones because image brightness is below threshold. This can conveniently be accomplished by providing contrast means 218 in the flanking areas of the slit 214 (see FIG. 5a). Digitizer stripes 450 and 452 are in the capture zone 416 and will definitely cause hits as the brightness is above threshold, the center of the slit 216 (FIG. 5a) being clear or contrast enhanced. Digitizer stripes 448 and 454 may cause hits depending on the speed of scanning and the size of the target object.

The horizontal lines in the area 470 represent the edges between adjacent video scan lines. The numbered scan lines 470a through 470m are the spaces between the drawing lines. With the interlace of NTSC, lines 470a, 470c, 470e, 470g, 470i, 470k, and 470m would be in either the even or the odd field of the frame. Lines 470b, 470d, 470f, 470h, 470j, and 470l would be in the opposite field of the frame.

Capture areas 476(a-m) and 478(a-m) are defined as the intersection of a digitizer stripe and a scan line. For example, in FIG. 5d capture area 476a represents the intersection between digitizer stripe 450 and scan line 470a, and capture area 478a represents the intersection between digitizer stripe 452 and scan line 470a. Thus, the target object image 430 will be detected in 26 capture areas. Each target object represents a shot hole roughly 2/10ths inch large, i.e. in diameter, though shot holes or other target images may not be round.

In a presently preferred embodiment, features as small as 1/30th inch will be examined. Each will be detected in 4 or more capture areas and will be seen at least twice in each due to the scan rate (refresh rate). This gives good confirmation of validity of a detected shot hole for even small objects. This high degree of resolution is maintained over the entire 4-foot length of the aperture 214. The resolution, i.e. size of feature (image) detected, can be changed by the optical geometry and magnification of the system.

During the scanning mode, both the target object image 430 and the image spot of the NTSC signal are moving. In the preferred embodiment, the target object 430 will pass the capture zone 416 at a nominal speed of 2 inches per second. Each point on that object will be in the capture zone 416 for about 1/5th second and in any of the capture areas 476a through 476m less than half that long. Since NTSC returns to each image spot every 1/30th second, each point would be seen in the capture areas 476a through 476m on average more than twice but less than three times.

The arrow heads 480 illustrate the amount the target image (shot hole) would move in the 1/30th of a second between NTSC samples. Since real target objects are not pure point sources and since the digitizer 500 (see FIG. 6) stretches hits, three or more hits are likely for any given capture area for any given target object image.

Adjacent even-field and odd-field scan lines, such as 470d, 470e, see the target object 430 at different times. For NTSC, one field will be 1/60th second later than the other. Similarly, target objects at the top of the field will be seen up to 1/60th second earlier than those at the bottom. This time difference or "skew" is compensated for during target calibration and pattern target processing.

Figure 7:
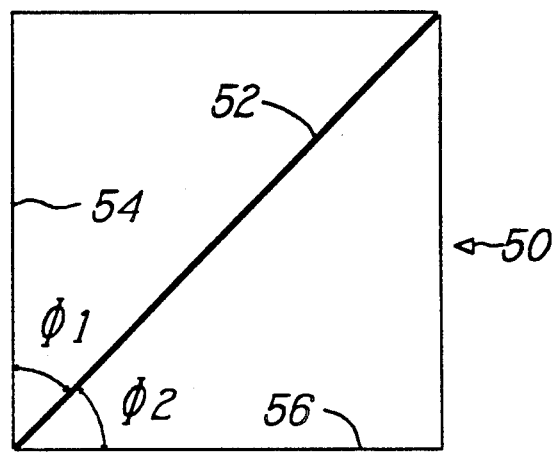
FIG. 7 is a front elevation view of a calibration target.

A target object which falls in the overlap area between zones, such as target object 436 of FIG. 5a, shows up on two capture zones 416 in aperture stripes 466 and 492 as best seen in FIG. 5b. However, any such overlap target object will show up in the same NTSC frame or sequence of frames. During calibration process scanning, a single small portion of the slit 52 of FIG. 7 is visible at all times. When that portion appears in more than one aperture stripe of the video image, it is evident that overlap is occurring. Counting the number of NTSC scan lines in that portion determines the degree of overlap. During the processing of the calibration target, 7 such overlap zones are found. When a target object such as 436 appears in the image 401 in the aperture stripes and on the scan lines identified during calibration as being in an overlap zone (near the top and bottom of the screen), its position is determined to be in an overlap area and the duplicate scan line observations (either the top image or the bottom duplicate image) are discarded or ignored immediately.

The data from all eight aperture stripes 460, 462, 464, 466, 490, 492, 494 and 496 are thus linked through the 7 overlap areas. This linkage of the stripes produces a continuous sequence of scan lines to cover the whole aperture. Using 8 stripes and the NTSC system, it is possible to get 3000 lines of resolution over the entire aperture when duplicate scan lines in the overlap areas and scan lines which occur during the vertical synchronization interval are eliminated. If more resolution were required, the aperture could be divided into more zones by adding more mirrors, thus increasing the total number of scan lines covering the aperture.

By processing the whole target in one pass, the need for edge matching or mosaic processing is eliminated. This is particularly important when processing pattern targets. Edge matching technology requires a series of overlapping images which are fused into single images by matching contiguous edges of zones or regions of an entire field. In order to accomplish this, there must be sufficient detail in the overlap area that matches can be found. With pattern targets, it is likely that there will be large areas with very few holes making feature matching ambiguous and unreliable. By fusing the 8 zones (stripes) of data during the scanning process the ambiguities are eliminated, and both speed of identification and reliability is vastly improved.

VIDEO SIGNAL DIGITIZER

Figure 6:
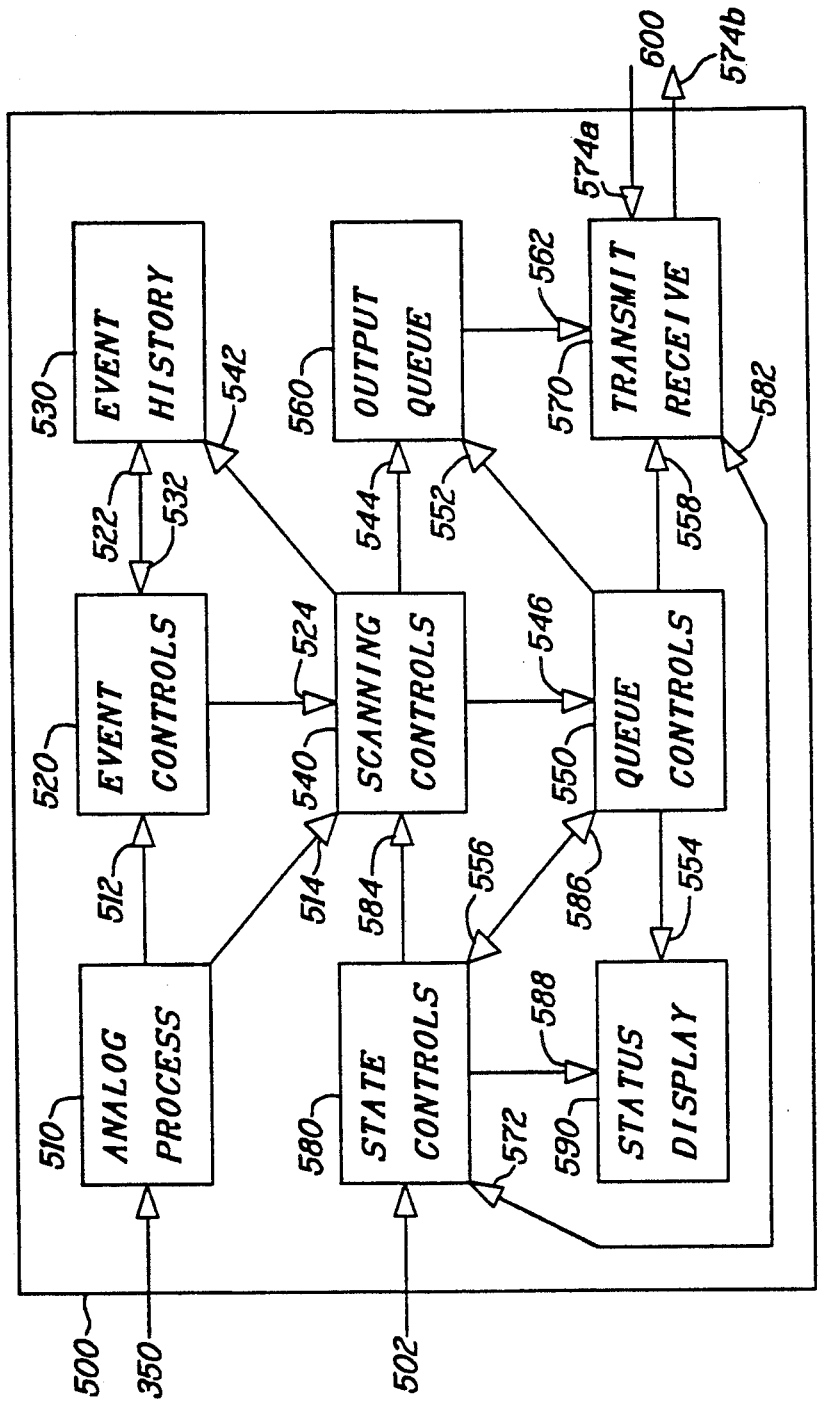
FIG. 6 is a block diagram showing in detail the operational steps of the video signal digitizer.

Referring to FIG. 6, the operational steps of the video signal digitizer 500 will now be discussed. Video signal digitizing is implemented by nine related functions 510, 520, 530, 540, 550, 560, 570, 580, 590. The digitizer 500 receives input signals from three sources including the video recording and conversion device 350, operator control switches 502 and the computer 600, input therefrom being designated 574a. The output of the digitizer 500 is in the form of "words" of digital information 574b representing features seen by the camera which are sent to the computer 600. In the preferred embodiment, the communication between the digitizer 500 and the computer 600 is by standard RS-232-C serial I/0 facilities.

It is understood that the digitizer/computer interface of this invention is not limited to the use of a RS-232-C as any other interface used for data conversation between Data Communications Equipment (DCE) and Data Terminal Equipment (DTE) may work with equally good results. Alternatively, the digitizer may be incorporated into the computer and may communicate directly with the computer by its buss.

In operation, the analog processing section 510 receives a composite video signal from the video recording and conversion device 350. The analog processing section 510 produces digital outputs including detection of sync level, detection of bright-spot signal output, and a timed signal output. The sync-detected output and a timed signal are sent via signal path 514 to the scanning controls 540. The timed signal indicates vertical-sync-in-progress. The bright-spot-detected output is sent via signal path 512 to the video event controls 520.

The video event controls 520 can operate in either a bright-spot mode or an edge detecting (edge-of-spot) mode. In the bright-spot mode, the event controls provide signals in the form of "on" data via signal path 524 to the scanning controls 540 when a spot (i.e., light showing through a hole on the paper target) is present. If no spot is present there is no signal. In the edge-detecting mode, inputs from the scanning controls 540 are used to access event history 530 via signal path 542 and retrieve the appropriate history information for the event controls 520 via signal path 532. When confirmed changes are detected for any capture area, these changes are signaled in the form of either "now on" or "now off" data via path 524 to the scanning controls 540. Whether or not confirmed changes are signaled, the history for the current capture area is saved from the event controls 520 to the event history 530 by signal path 522 for use on the next pass.

The scanning controls 540 maintain counters which perform the following functions: (1) define digitizer stripes in the visible part of each scan line; (2) track scan line numbers; and (3) record the number of video frames seen. Sync signals generated from the analog process 510 are sent via signal path 514 to the scanning controls 540 and are used to control the advancing and resetting of these counters. The counters include a digitizer stripe counter, scan line counter, and frame counter. The digitizer stripe counter is driven by an internal oscillator and is reset by sync. The scan line and digitizer stripe counters are provided as output data sent via signal path 542 to properly address event history 530. These counters as well as the frame counter are written to the output queue 560 via signal path 544 when a significant event occurs (e.g. an image spike or bright spot). The scanning controls 540 signal the queue controls 550 via signal path 546 when something should be recorded for transmission. Input received by the scanning controls 540 from the state controls 580 via signal path 584 can suppress all queue requests when the scanner is "off" or when the queue has filled.

The queue controls 550 manage the placement of words of information into the output queue 560 that are received from the scanning controls via signal path 544 and their subsequent retrieval via signal path 562 for transmission by the transmit receive function 570. The queue is a ring buffer addressed via signal path 552 by two counters (write and read). The write counter addresses the next place to write things into the queue. The read counter addresses the next place to retrieve information from the queue for transmission. The read counter is used to address the queue via signal path 552 during sync intervals. The write counter is used otherwise. When the counters are equal, the queue is empty. When the write counter is one less than the read counter, the queue is full. This information is signaled via signal path 556 to the state controls 580 to stop the scanning processes. Empty, full, and many stages in between are sent via signal path 554 to the status display 590. The empty condition is signaled via path 558 to suppress data transmission.

The transmit and receive function 570 sends blocks of characters to the computer 600. Each block consists of four bytes. Each byte consists of a start bit, a synchronization bit, seven data bits and one stop bit. The twenty eight data bits are taken from the output queue 560 via signal path 562 and from available queue control information via signal path 558 and system state information via signal path 582. The transmit and receive function 570 also receives state change requests via signal path 574 from the computer 600. These requests are sent to the state controls via signal path 572 to change or update the system state.

The state controls 580 receive operator input signals via path 502 and computer signals via path 572 for controlling operation of the digitizer 500 including allowing or inhibiting scanning, allowing or inhibiting transmission to the computer, as well as reset functions and setting of various test modes of operation. The state controls 580 also react to internal conditions, such as queue-full condition sent via signal path 556 from the queue controls 550, in order to change state to prevent error conditions. The state information maintained is used by other functions, such as the transmit and receive function 570 (via signal path 582), the scanning control function 540 (via signal path 584), and the queue control function 550 (via signal path 586) to insure correct operation. The current state information is made available to the operator on the status display 590 (via signal path 588) and, if the transmitter is active, is also sent to the computer 600 via signal path 582.

The preferred embodiment of the video signal digitizer 500 uses standard static memory integrated circuits, a number of SSI and MSI components and six programmable array logic (PAL) devices. Standard PAL techniques, such as those disclosed in *Designing with Programmable Array Logic* (2nd Ed), 1981, published by McGraw-Hill Book company may be used in implementing the video signal digitizer PALS of this invention. The functions of those six special devices are identified below.

PAL 1 is part of the queue controls 550 and provides queue content signals including empty, full, and seven bits of non-linear Queue-Space-Remaining status. PAL 2 is part of the event controls 520 and manages data in and out of the event history memory 530. It also participates in edge detecting in that mode of operation. PAL 3 is part of the scanning controls 540 and filters the sync signals to cause counter resets to occur at only the appropriate times. PAL 4 is part of state controls 580 and receives the operator inputs 502 as well as signals from other parts of the system. Actual state conditions are maintained in PAL 4. PAL 5 is part of the transmit and receive function 570 and is responsible for multi-plexing various state information into a portion of the twenty eight bits available for data in each block transmitted to the computer 600. PAL 6 is also part of the transmit receive function 570 and is responsible for controlling the transmission of the forty bits which comprise each data block through the RS-232 interface.

CALIBRATION TARGET

FIG. 7 shows the preferred calibration target 50. The calibration target 50 is wrapped about drum 110 (see FIGS. 1 and 2) and is scanned to provide data to calibrate the apparatus. Each target 50 is made of heavy paper and is at least as large as the pattern target 60 of FIG. 8 (discussed in more detail below). The single notable feature of the calibration target 50 is the presence of a slit 52 through which light from lamp 150 can pass. This slit is preferably 1/16 inches wide for the calibration target 50 of the preferred embodiment of the invention and is placed along the diagonal of the square target. The two triangular portions of the target on each side of the slit are held together by transparent tape (not shown). The angles $\phi_1$, $\phi_2$ of slit 52 with respect to the side 54 and the bottom 56 of the target are the same and are 45 degrees.

PATTERNING TARGET

Figure 8:
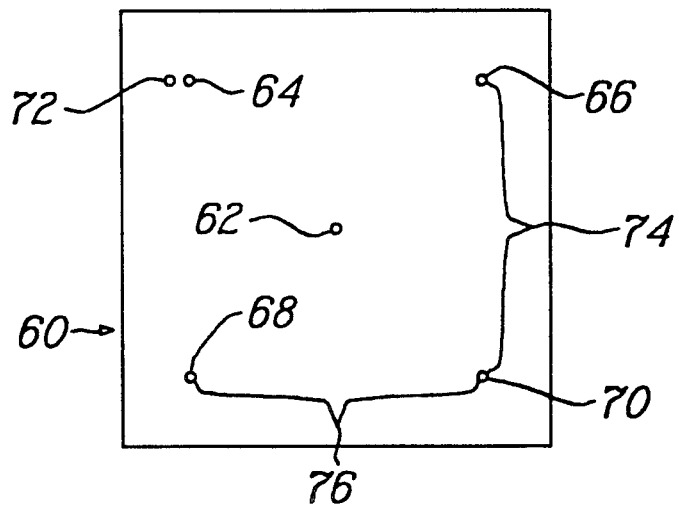
FIG. 8 is a front elevation view of a patterning target corresponding to the calibration target of FIG. 7.

FIG. 8 shows the preferred pattern target 60. It is made of heavy paper and is large enough to capture all the shot holes of interest, even those that are considerably off center. As an example, the pattern may be centered several inches high and to the right due to pointing errors or irregularities in the shotgun. Pattern target 60 has 6 reference holes in it. These holes are ¼ inch in diameter for this preferred target and they are placed in a very particular orientation. The center hole 62 is used as a pointing aid for the person shooting the pattern. The corner holes 64, 66, 68, 70 are located 18 inches above and below the center hole and 18 inches to the left and right of the center hole 62. These holes are used to true up the scanned image to be perfectly square, rotated and sized correctly. The vertical and horizontal distance between corner holes 74, 76 is the same in both directions and is 36 inches. The final hole 72 is referred to as the extra hole and is 1 inch to the left of the upper left corner hole 64. It is used to re-orient the scanned data to determine which side is up and left and which is the front of the target. This hole could be anywhere which allows the orientation of the target to be determined. The preferred position was selected to put it far enough from the center of the pattern to avoid being hit with shot and far enough from the edge of the target to not be damaged by tacks used to attach the target to a backing board while shooting the pattern.

TARGET SCANNING PROCESS

Figure 9:
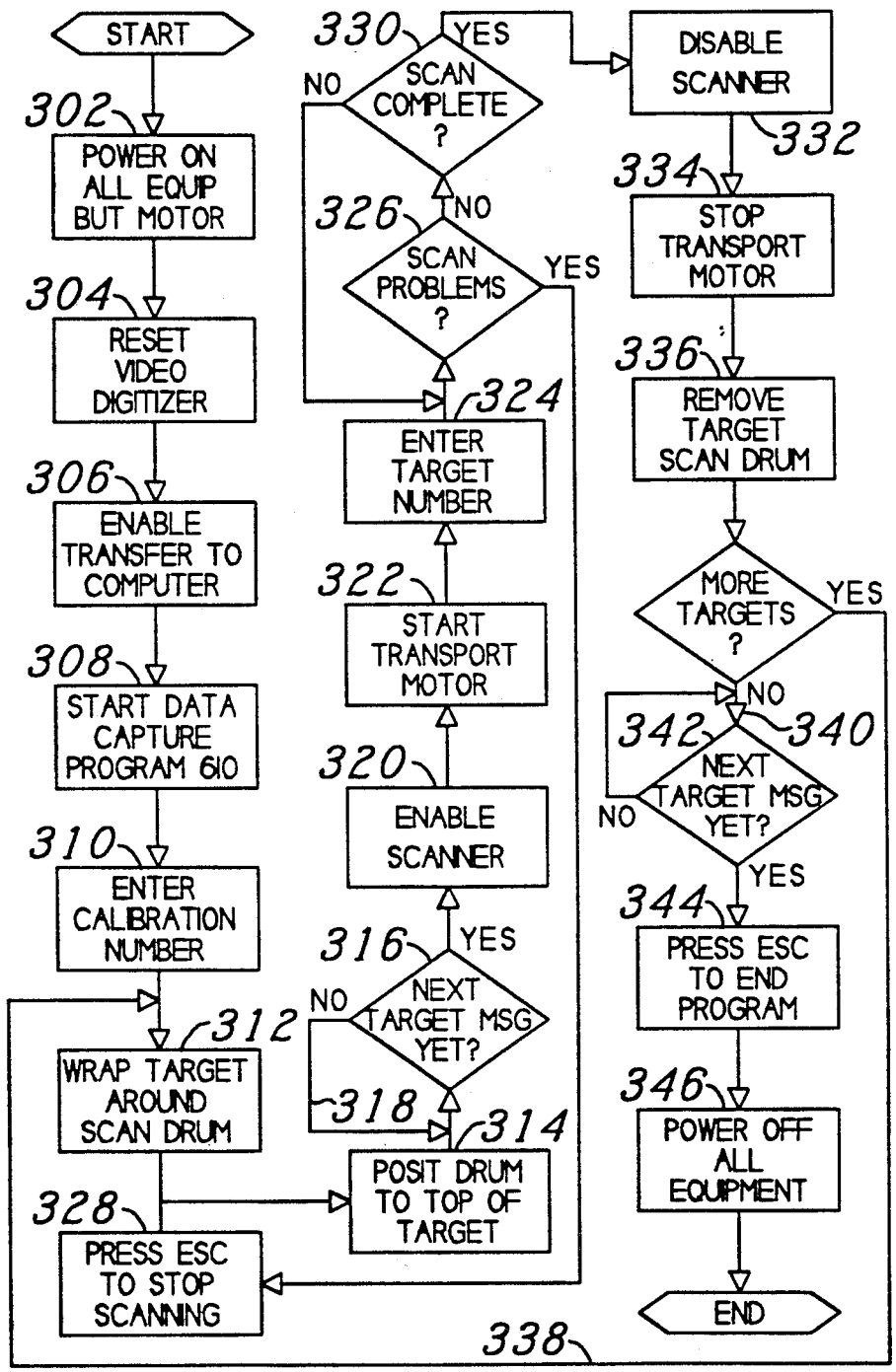
FIG. 9 is a flow chart showing the operational steps of target field scanning.

FIG. 9 describes the process for scanning the targets 50 and 60 and capturing the information scanned to the digital storage memory 800.

The process begins at step 302 by powering on the electrical components including the target illumination means (lamp 150 of FIG. 2), the video camera 190, the video recording and conversion device 194, the capture monitor 400, the video signal digitizing electronics 500, the computer 600 and the digital storage memory 800.

Next, the digitizing electronics 500 are reset at step 304 to empty the internal queue of data to transmit and to set the system to the "Not Scanning" and "Not Transmitting" state. Once all the video equipment is warmed up and appears to be functioning normally, the video signal digitizing electronics state is set to Transmitting at step 306. As there is no information yet available to transfer, no data will actually be transferred at this time.

The data capture program is started at step 308 by operator entry into the keyboard of the computer 600 (see FIG. 6). This is also indicated at block 610 in FIG. 10 which is a block diagram/flow chart that illustrates the detail of the interrelationships of the various programs associated with the target scanning process. The capture program prompts the operator to enter the number of the calibration. The number is assigned to keep each scan of the calibration target 50 separate from other scans of that target and to establish a relationship to scans of pattern targets 60 which will be performed. This number is entered at step 310 (FIG. 9) as a three character value. In the preferred embodiment (MS/DOS or OS/2), this value is used as the file name extension for all targets scanned. Program operation will vary depending on whether the calibration target had been previously scanned and processed or whether it will be scanned during this run. This will be covered in more detail with reference to the discussion of FIG. 10 below.

Once the program is running, the first paper target (e.g., the target 50 of FIG. 7 or target 60 of FIG. 8) is wrapped around the scanning drum 100 in preparation for scanning at step 312. The target attachment process is completed at step 314 when rotation of the drum aligns the beginning of the target with the scanning aperture 216 (see FIG. 3). At this point in the process, it is necessary to wait for the program to prompt for the target number of the next target at step 316. However, since this is the first target, no wait will be required. Iterative loop 318 indicates whether waiting may be necessary for subsequent target scans.

Once the program signals it is ready to receive more data, the digitizing electronics state is set to Scanning (and Transmitting) at step 320. From this time until the target information is completely transferred to the program, frame marker words and scanning data words will be sent from the video signal digitizing electronics 500 to the computer 600 (see FIG. 6). The transport motor 180 (see FIGS. 1 and 2) is then started to begin passing the target image in front of the scanning aperture at step 322. While the target is being scanned, the target number assigned to the target is entered into the keyboard of the computer at step 324.

During the rotation of drum 110 which causes the whole target to pass by the aperture 214, the operator validates that the process is proceeding normally at step 326. If problems occur (e.g., target comes loose or the drum rotation is interrupted, etc.) the operator terminates the scan by pressing ESC on the keyboard at stp 328. A retry (rescan) operation can then be attempted. (The program will set the scanner to Not Scanning when ESC is detected.) Assuming everything is progressing normally, the target will be completely scanned at step 330. The operator then disables the scanner by setting the state to "Not Scanning" at step 332. This means that frame words and scan data words will cease to be queued to the computer 600 (see FIG. 6). However, any queued data will continue to be sent until the queue is exhausted. The operator then stops the drum rotation at step 334 by turning off the transport motor 180. The scanned target is removed at step 336.

Iterative loop 338 checks to see whether there are more targets to process. If so, then the process loops back to mounting the next target to be scanned at step 312. If there are no more targets to be scanned (step 340) then the operator waits at step 342 until the program has completely processed the previous target and then presses ESC to signal the data capture program to terminate at step 344. Once the program has closed all files and returned to the operating system, all equipment can be powered off at step 346 to terminate data capture processing.

REPORT PRODUCTION FROM SCANNED DATA

Figure 10:
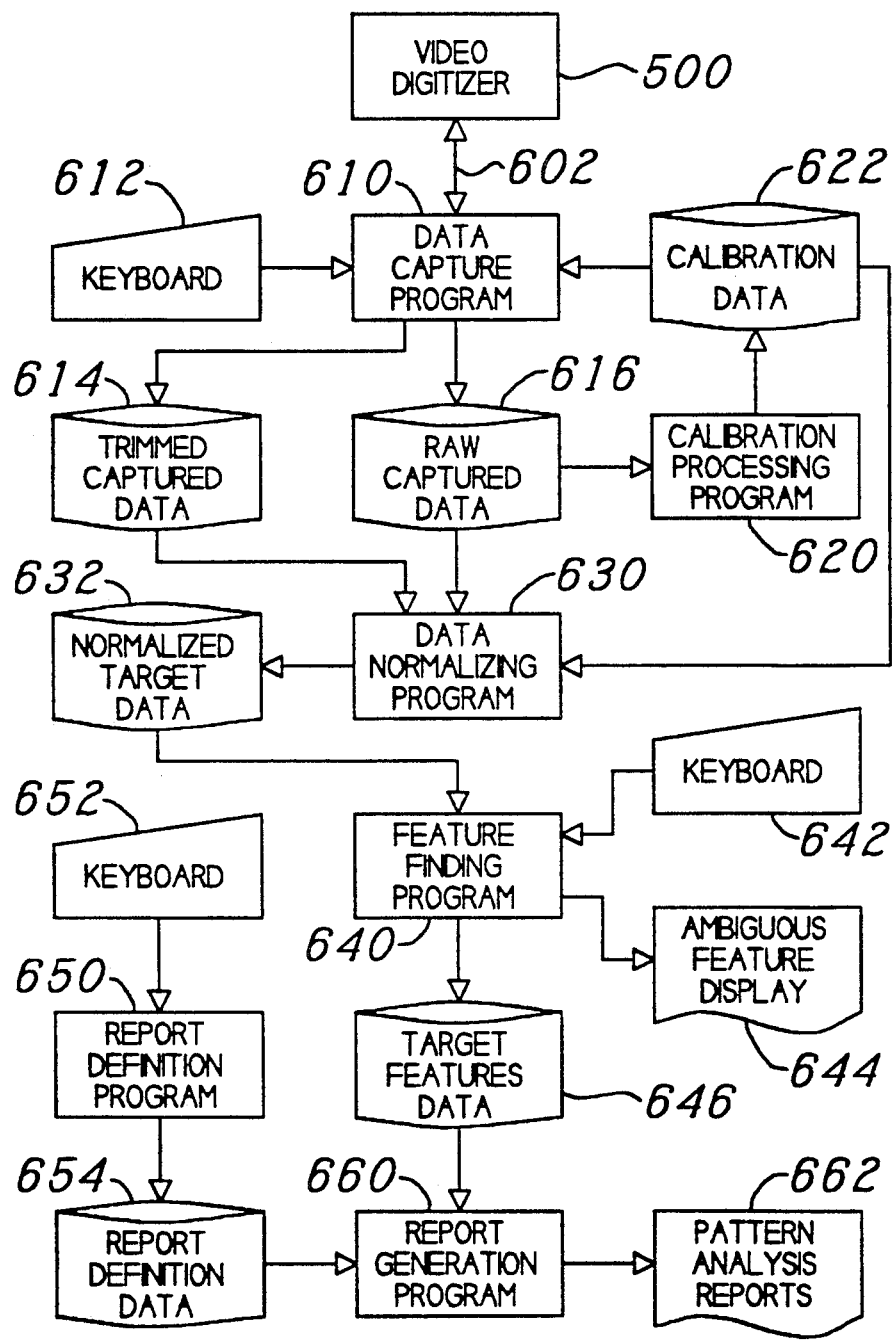
FIG. 10 shows a block diagram showing in detail the overall process steps and the interrelationships of the various computer programs used in the invention.

FIG. 10 is a flow diagram illustrating how scanned data is processed. Electronic Video Digitizer 500 produces data which is sent over RS-232 channel 602 to the computer.

The Data Capture Program 610 is responsible for collecting the data from the RS-232 link, modifying the format of the data and storing it in either a Trimmed Captured Data storage memory 614 or in a Raw Captured Data storage memory 616. A Keyboard 612 is sued in the preferred embodiment as the means of entering target identification information to the program and to signal operator-discovered exception conditions. This program operates in one of two modes: calibrated and uncalibrated. If Calibration Data 622 is available at the time the program is initiated, then it runs in calibrated mode and produces Trimmed Captured Data 614. The data produced in this mode contains only data which appears on Lines and Digitizer Stripes (see discussion of FIGS. 5a-5d) which are valid for later analysis. If Calibration Data 622 is not available during initialization of the Data Capture Program 610, then it operates in uncalibrated mode. In this mode, all data is transferred to the Raw Captured Data storage 616. This data is approximately three times the volume of the Trimmed Captured Data 614. The format of the data stored is the same in either mode and consists of the line number and digitizer stripe number which were reported (and valid in calibrated mode) and the frame number adjusted to produce a monotonically increasing number for each target.

The Data Capture Program 610 initialized by the operator at step 308 in FIG. 9 also converts all "edge-detection" data received over the RS-232 link 602 into "bright-spot" data, which is easier to process by the calibration processing program 620 and the Data Normalizing program 630. But there is a benefit to transmitting edge of spot data from video digitizer to the Data Capture Program 610 for conversion since bright spot data is bulkier. Thus, transmitting edge of spot (image) data reduces data traffic over a potentially slow link 602.

The Calibration Processing Program 620 reads data from the Raw Captured Data storage memory 616 which has been scanned from the calibration target 50 (FIG. 7) and places the resulting information in a Calibration Data storage means 622 for use by other programs. Referring now to FIGS. 1, 7 and 10 as the calibration target 50 is scanned, the motion of the 1/16" slit 52 is first seen by the video camera 190 after which it is then detected by the Video digitizer 500 and is then captured by the Data Capture Program 610. The Calibration Processing Program 620 selects the scan lines and digitizer stripes which represent the best signal to process for regular targets.

Multiple sightings and adjacent digitizer stripe sightings are eliminated. The result is a list of line and digitizer stripe combinations which are valid with the corresponding X coordinate value and a Y coordinate adjustment. Y coordinate values are determined by the frame number (time) at which the sighting occurs. Since the 525 lines of the NTSC signal span a period of 1/30 of a second and since the target is moving during the sample interval, an adjustment is necessary to produce a straight sample line. The X and Y coordinate information is not used by the Data Capture Program 610 but is used by the Data Normalizing Program 630. The Calibration Processing Program 620 operates as a daemon constantly looking for Raw Captured Data 616 from calibration targets 50 to process.

The Data Normalizing Program 630 operates as a daemon looking for Trimmed Captured Data 614 or Raw Captured Data 616 for which the appropriate Calibration Data 622 is available. It should be understood that the use of the term "daemon" here refers to a Unix process which runs in the background and which may provide services or authorizations for the entire system. Processed target information is placed in the Normalized Target Data storage means 632. The normalization process converts digitized values for the line and digitizer stripe information into X coordinate values (i.e., the distance measured along the length of aperture 214) and converts the frame number into Y coordinate values (i.e., the distance measured along the direction of the rotation of drum 100). The resulting data is "square" such that the distance between holes can be accurately calculated using X and Y values of the same scale.

The Feature Finding Program 640 operates as a daemon which occasionally asks for help. It searches for Normalized Target Data 632 to analyze and find features of interest in the target data. X coordinate, Y coordinate, and feature Size are recorded in the Target Features Data storage memory 646. Image features are "grown" by combining adjacent points. When no new points are added to a feature during a frame (i.e., for some small change in value of Y due to drum rotation) the feature is centered and recorded. The X and Y coordinates, and the number of points included are placed in the Target Feature Data storage memory 646. Each feature is assumed to be a circle of some size. If the feature gets larger than some size or if the feature doesn't appear to be round, an image of the feature and surrounding area is produced on the computer display as an Ambiguous Feature Display 644. The operator uses the keys and cursor controls of keyboard 642 (or alternatively, a mouse or other like pointing device) to indicate to the Feature Finding Program 640 specific features to be recorded (if any) and disposition of the data points shown in the image. Operator assistance helps when holes produced by things other than shot (such as the wad) are examined or when two or more shot holes touch. This assistance is also used for targets shot at very close range where the entire center section of the target may be missing.

The Report Definition Program 650 is an operator interactive program which captures operator information and requests from a keyboard 652 (or mouse or other like pointing device) and records it on the Report Definition Data storage means 654. The program gathers information about the customer (name, address, etc.) as in normal order entry operations, the targets provided (target number, gun characteristics, barrel choke, powder type and weight, primer used, wad used, shot size and weight, hull used, manufacturer of various components, etc.) and the reports requested (standard counts as well as unique analysis as described hereafter in FIGS. 12-16).

The Report Generation Program 660 operates as a daemon looking for completed Report Definitions 654 for which Target Feature Data 646 is available for producing reports at step 662. Much of the reporting is routine and need not be described here. What will now be described is the processing required to produce the reports shown in FIGS. 12-16.

In preparation for report creation, the data is first centered, oriented and fine tuned for size. The largest holes are identified first As is seen in FIG. 8, there should be six reference holes 62, 64, 66, 68, 70, 72 which are about ¼ inch in diameter. There may be one larger hole in the center of the pattern. The rest of the holes should be small. The four corner holes 64, 66, 68, 70 are used to fine tune the X and Y coordinate data for the whole target.

In the preferred embodiment, these holes are pre-drilled to be on the corners of a 36 inch square. The X values and Y values of the left and upper holes are subtracted from the values of the coordinates for the lower holes. Any deviation from the 36 inch nominal size is removed by applying a multiplication factor to all the X and Y values to bring the target into exact scale. Rotation by a few degrees clockwise or counter clockwise is also performed at this time to truly square and align the target holes. For some non-standard targets, the reference holes are not present and this fine tuning is not performed.

Next, the extra hole 72 of FIG. 8 is located. While extra hole 72 is shown to be located just to the left of corner hole 64, it may be oriented during scanning to appear to be located to the outside (right or left, above or below) of any of the other corner holes 68, 70 or 66. A transformation will be performed to make the data read correctly. For example, to move the extra hole 72 to the left or right side of a corner hole from a position either above or below one of the four corner holes 64, 66, 68 and 70, an exchange of all X and Y values is performed. To flip the extra hole to the left X values are inverted. To flip the extra hole to the top, Y values are inverted. Table I shows the transformations required the eight possible cases.

TABLE I

| Corner Hole Position | Extra Hole Position | Swap X and Y Values? | Invert all X values? | Invert all Y values? |
|---|---|---|---|---|
| Upper Left | Above | YES | NO | NO |
| Upper Left | to the Left | NO | NO | NO |
| Upper Right | Above | YES | YES | NO |
| Upper Right | to the Right | NO | YES | NO |
| Lower Left | Below | YES | NO | YES |
| Lower Left | to the Left | NO | NO | YES |
| Lower Right | Below | YES | YES | YES |
| Lower Right | to the Right | NO | YES | YES |

Using all remaining data, the center of the pattern is determined.

In the preferred embodiment, this is accomplished by selecting the median X and Y values independently and taking the average of the two center values if there are an even number of features. If there is a large hole (e.g., a target shot a close range) the center of that feature is taken as the center independent of the result of the X-Y analysis. If there is a discrepancy, this is also reported.

Once the center is found, all the X and Y coordinate values are again charged to place the center of the pattern at X=0 and Y=0. The position of the center reference hole 62 of FIG. 8 relative to this pattern center is reported as "Pointing Deviation". Once all the adjustments to the X and Y coordinate values are made, the reference hole data is discarded.

Finally, a separate representation of all the points is created producing a representation of each data point using polar coordinates. This set of information is sorted in order of distance from the center of the pattern. For each point then, rectangular coordinate information is maintained for: (1) left or right of center (X); (2) above or below center (Y); (3) radial distance from center (R); and (4) angular direction from center (A).

If a large hole is present and has been used as the center of the pattern, and if there are only a few holes outside the 30 inch diameter, then the number of shot in that large hole is calculated. The shot charge information is examined to determine how many holes should have been present in the pattern. This is presented by the operator as either an actual count of shot in the charge or is derived from weight and shot size values provided. Once the total number of shot are known, the number of simulated features can be determined and provided. This value allows simulation of all missing features (shot holes) at the center of the pattern so that 100 percent of the shot charge can be accounted for on the pattern target.

The Report Generation Program 660 and Pattern Analysis Reports 662 (FIGS. 10 and 11) display the results from the scanned targets in a variety of forms as seen in FIGS. 12-16.

Figure 11:
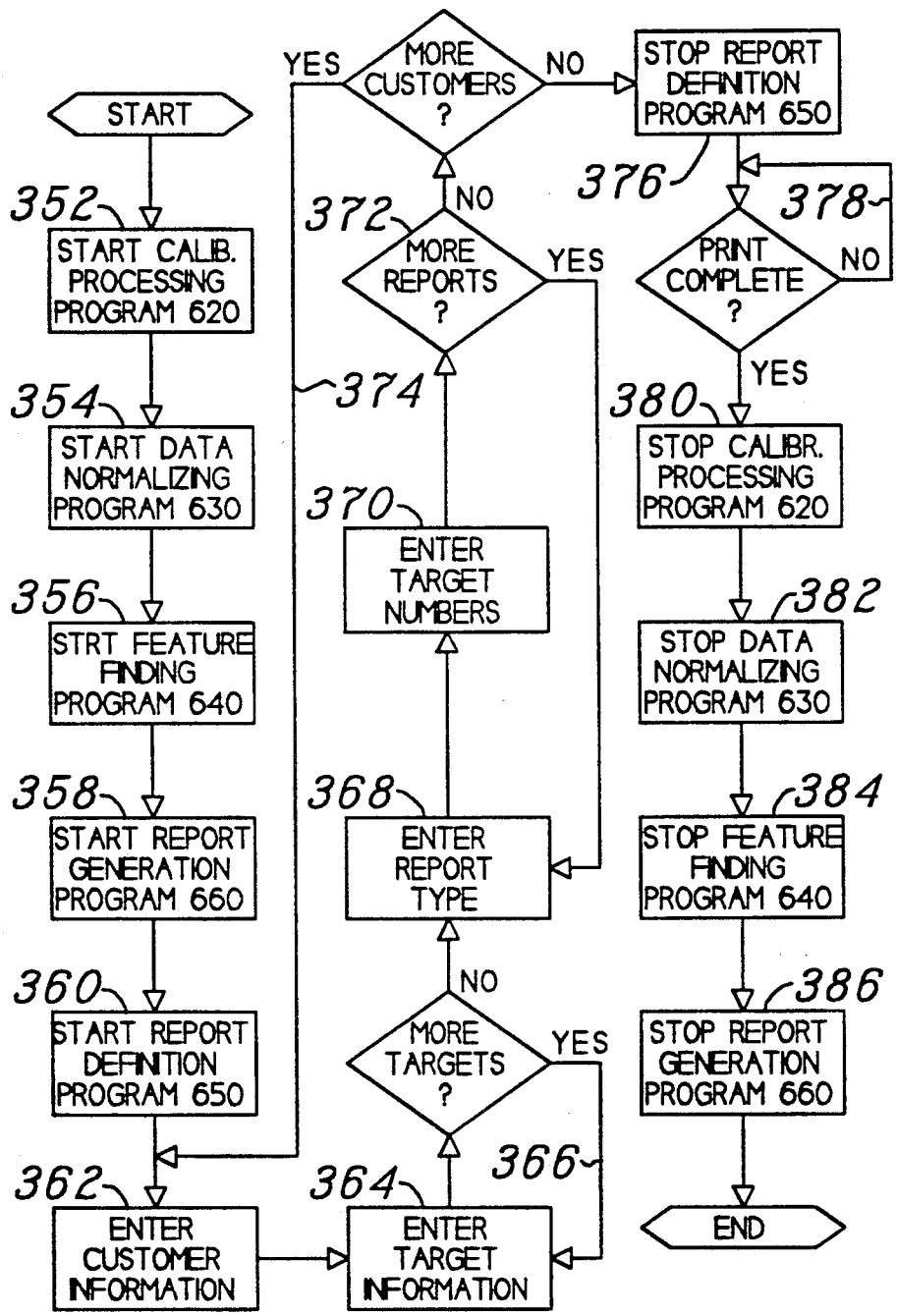
FIG. 11 is a flow chart showing the operational steps of report generation.

The process for producing reports from the data previously scanned and saved on the digital storage memory 800 is described by the flow chart of FIG. 11. The first part of the processing involves starting the four daemon programs 352, 354, 356, 358 (see FIG. 10). The calibration processing daemon program 620 is started at step 352 to process scanned files to produce files which identify the Lines and Digitizer Stripes of interest for target processing (see FIGS. 5a-5d for a detailed discussion). The data normalizing daemon program 630 is started at step 354 to "square up" the data making the horizontal and vertical position values to the same scale. Any unnecessary data from spurious digitizer stripes and lines is discarded during the processing. Next, the feature finding daemon program 640 is started at step 356. This daemon finds the circular holes represented by the data and produces a file describing a location and size of the features found. The final report generation daemon 660 is started at step 358 to produce printed hard copy reports according to the specifications filed. These four deamons described above can be started at any time and in any sequence. Since they do have to be started and stopped at sometime, they are shown here for convenience.

Once the daemons are running, the interactive report definition program 650 is started at step 360. The first information entered is the customer information at step 362. Name, address and other information normally associated with a customer are entered for use in the rest of the process. Next, specific target information is entered at step 364 for each target provided by the customer. Specific target information includes but is not limited to information concerning the gun barrel-type, shot load, powder charge, and primer used. In addition, data regarding distance from the target, weather conditions and any other miscellaneous information which might effect the pattern may be recorded. All of this information is associated with a target serial number which is used for reference in all subsequent processing. This is repeated at step 366 until all targets have been accounted for.

Once all the target information has been entered, the reports requested information is entered at step 368. These reports are described in greater detail with reference to FIGS. 12-16 below. After the report type is selected (at step 368), then all the targets which are to be included in the report are selected at step 370. Some reports may operate against only one target while others may show relationships between several targets. This process is repeated at step 372 for each report requested by the customer.

The whole data entry process, including customer information, target information and report information, is repeated at step 374 for each customer whose order is being processed. When no customer orders remain, the report definition program is terminated at step 376. The operator waits at loop 378 until all the reports have been printed. This is confirmation that all the above mentioned daemons programs of FIG. 10 have completed their work and can be terminated. The calibration target processing daemon is stopped at step 380, the data normalizer is stopped at step 382, the feature finding daemon is stopped at step 384 and finally the report generation daemon is stopped at step 386. Again, the order of termination of the daemons is not critical.

During the processing of the image data, data formats are chosen to optimize the aggregate size of the data required to represent the image. As an example, consider the following which is typical. A pattern target as in FIG. 8 is shot producing 400 shot holes. Each shot hole is large enough to be seen on 6 scan lines. Each capture zone is covered by two digitizer stripes. The overlap of the capture zones is 10 percent of the length of the capture zone at each end. The 6 reference holes are each seen on 25 scan lines. By operating the video digitizer 500 in edge-detection mode, two 4 byte words of information are produced for each hole for each scan line in each digitizer stripe. This yields $400 \times 6 \times 2 = 4800$ words for shot holes plus $6 \times 25 \times 2 = 300$ words for reference holes for a total of 5100 words. Due to duplication which happens in the seven overlap zones, the true total number of words is expanded to about 5600. This will be transmitted over line 602 as 22400 bytes or 224000 bits including start and stop bits. At the very common transmission speed of 9600 bits per second, this information will be transferred to the Data Capture Program 610 in under 24 seconds which is also about how long it took to scan at a drum rotation speed of 2"/sec. In the case when the Data Capture program is operating in calibrated mode, half of the words received will be discarded as being in duplicated digitizer stripes, and 10 percent more will be discard because they were in overlap areas of the capture zone. This brings us back to 5100 words of data in edge-detection mode. At this point the data is converted to bright spot data to make further processing easier. In the typical case where each spot is bright for 4 frames, the data will be expanded back up to 10200 words or 40800 bytes in the Trimmed Captured Data store 614. This store is transient in nature and the storage device operates very quickly so the tradeoff to increase size to reduce processing complexity is optimal. The size of the Normalized Target Data 632 is the same as the Trimmed Captured Data 614. The Feature Finding Program 640 combines all the image data relating to a single hole into one 6 byte entry representing the position and size of the hole. This reduces the data back to $(400 + 6) \times 6 = 2436$ bytes to completely represent the target data. This data is retained indefinitely to allow reports to be prepared much later, even after the customer has seen the first set. This processing optimizes the data to be as compact as possible during the bottleneck of communication between the video digitizer 500 and the Data Capture Program 610 and also on the long term digital storage medium.

REPORT FORMAT

Figure 12:
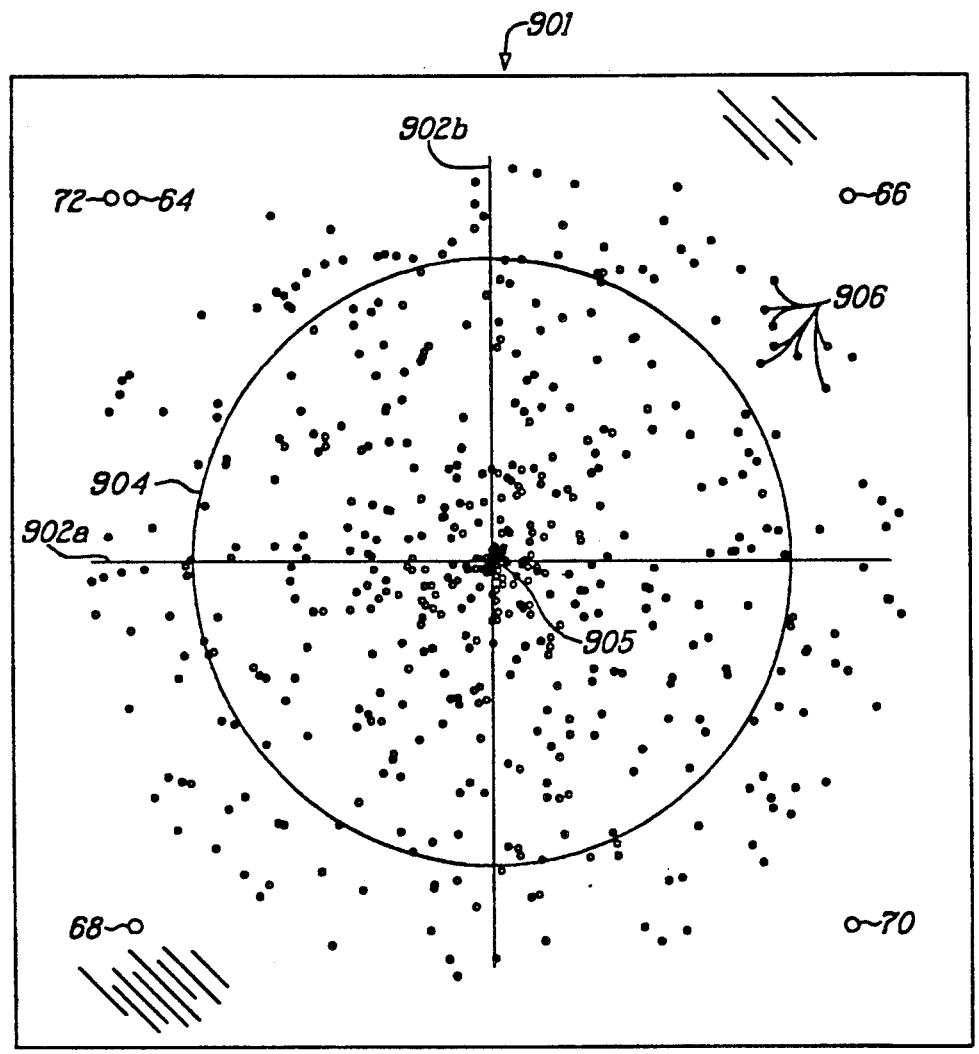

FIG. 12 shows a simple mapping of the holes found in the target 901 onto a report format. Cross hairs 902a and 902b are added to identify the center of the pattern 905 and a 30 inch diameter circle 904 is drawn as a reference. Each shot hole 906 in the pattern target is represented by a small circle. The full sized target is 48"×48". The Report is typically on 8½×11 or A4 paper with the target represented in a 6"×6" square.

To produce the report format shown in FIG. 12, the Report Generation Program 660 of FIG. 10 draws cross hairs 902a, 902b which intersect at the center 905 of the shothole pattern and a circle 904 of a 30 inch diameter as a standard for reference. Over this, small circles 906 are drawn for each of the data points found during scanning. Each circle is centered at the adjusted X,Y location.

Figure 13:
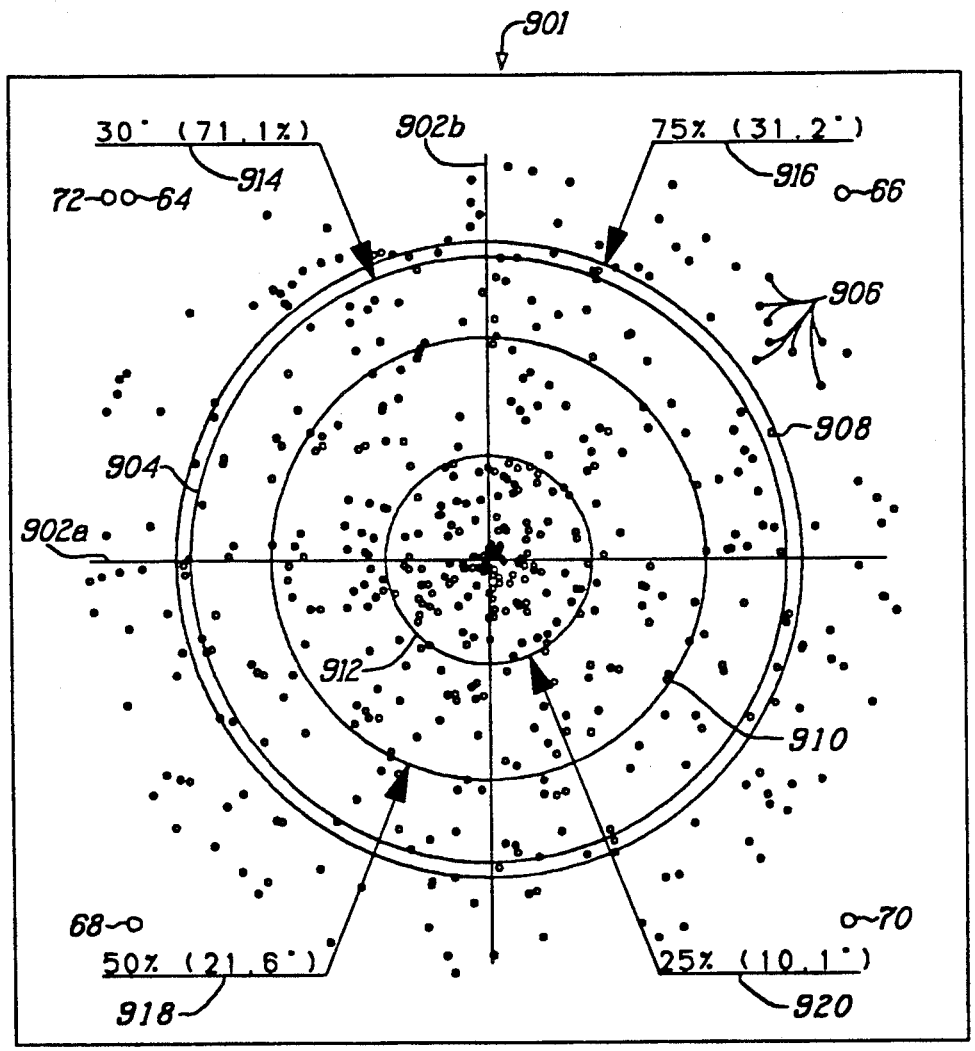

FIG. 13 contains all the same information as FIG. 12 with the addition of three more centered circles 908, 910, 912 and legends 14, 916, 918, 920. Each legend is connected to the appropriate circle for a graphical representation of the percentage of shot holes that fall within a particular circle. For example, legend 914 for the 30" circle 904 indicates that 71.1% of the shot holes 906 scanned fall within the 30 inch circle. The legend 916 for the 75% circle 908 indicates that 75% of the shot holes scanned fall within a circle (circle 908) which is 31.2 inches in diameter. Similarly, the 50% legend 918 shows that half the shot holes are contained within a 21.6 inch circle (circle 910). Finally, the 25% legend 920 indicates a diameter of 10.1 inches as the size of the containing circle 912.

To produce FIG. 13, the Report Generation Program 654 first performs the same work required for FIG. 12, followed by the addition of three circles 912, 910 and 916 representing the 25%, 50% and 75% shot accounting, respectively. The circle size denote the percentage of shot that falls within that diameter circle. For example, one fourth of the shot falls inside the 25% circle. The size of these circles is taken from the polar representations sorted on radial distance from the center. All these circles 910, 912, 904 and 908 are centered at the center of the pattern 901. If a large hole was present, an additional 100% circle may be drawn. However, shot densities outside the 75% range are so low that there is little practical value in showing that circle.

Figure 14:
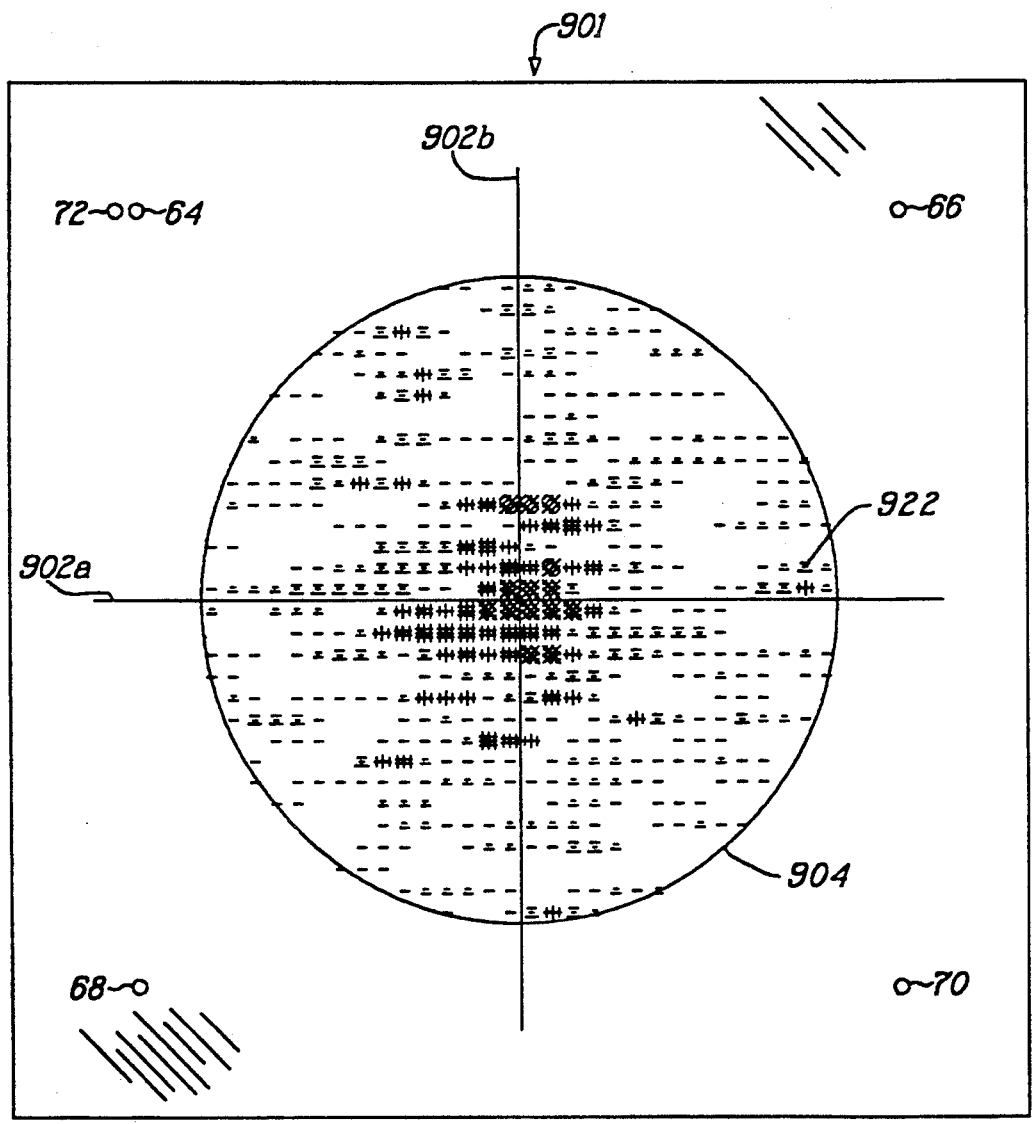

A report format may also show a density distribution by use of a distinguishable graphic representation. This type of graphical representation is best seen in FIG. 14 wherein all the holes are replaced by cross-hatched cells 922, each representing 1 inch square of the full sized target 901. Each cell 922 is distinctly cross-hatched to indicate the number of holes which would occur in a target (e.g, a clay target) which was centered in that position. Table II below indicates how many holes each level of cross-hatching represents. The referenced example cell 922 is shaded corresponding to three holes per target profile. For this example report format, only cells whose centers are within the 30 inch diameter circle 904 are processed. The cell size of 1 inch is arbitrary and was chosen to make it easier to read the densities from the chart. The densities shown were also arbitrarily selected to give good visual contrast between values of interest. Once a "target" has 8 holes in it, it is considered to be broken or dead, that is, it doesn't matter how many more holes are in it. Contrast may also be done by shading cells to correspond a particular hit density, much like population densities are shaded (or colored) on geographic maps.

To produce FIG. 14, the Report Generation Program 654 draws the 30 inch circle 904 and cross hairs 902a and 902b as before (FIG. 12). The processing consists of determining how many shot would have struck a physical (real) "target" centered at any one cell. For the analysis, a "target" profile is used which determines whether a shot hole was within the target profile or outside it. For FIG. 14 the target profile was a 3-cell rectangle one inch tall and three inches wide. This roughly matches the size of the standard clay target used in trap and skeet shooting. The rectangular coordinate information is processed to produce a density representation of how many shot would have hit the "target" profile the center of which is centered on that cell. After the number of holes falling inside the profile is determined, the center cell is shaded appropriately by means of dashes and cross hatches. Table II shows the key to the density symbols of FIG. 14.

TABLE II

KEY TO DENSITY SYMBOLS (FIG. 14)

Number of holes in 3-cell target profile centered on that cell

| = No holes | = 3 holes | = 6 holes |
| = 1 hole | = 4 holes | = 7 holes |
| = 2 holes | = 5 holes | = 8 or more holes |

Thus, examining each cell in turn gives a picture of the likelihood of a "kill", giving the number of hits on a target profile centered on that cell.

Cells whose centers are outside the 30 inch circle were not processed for FIG. 14 for purposes of clarity. While the cells represented in FIG. 14 represent 1 inch square areas it is understood that any convenient cell size can be used.

Figure 15:
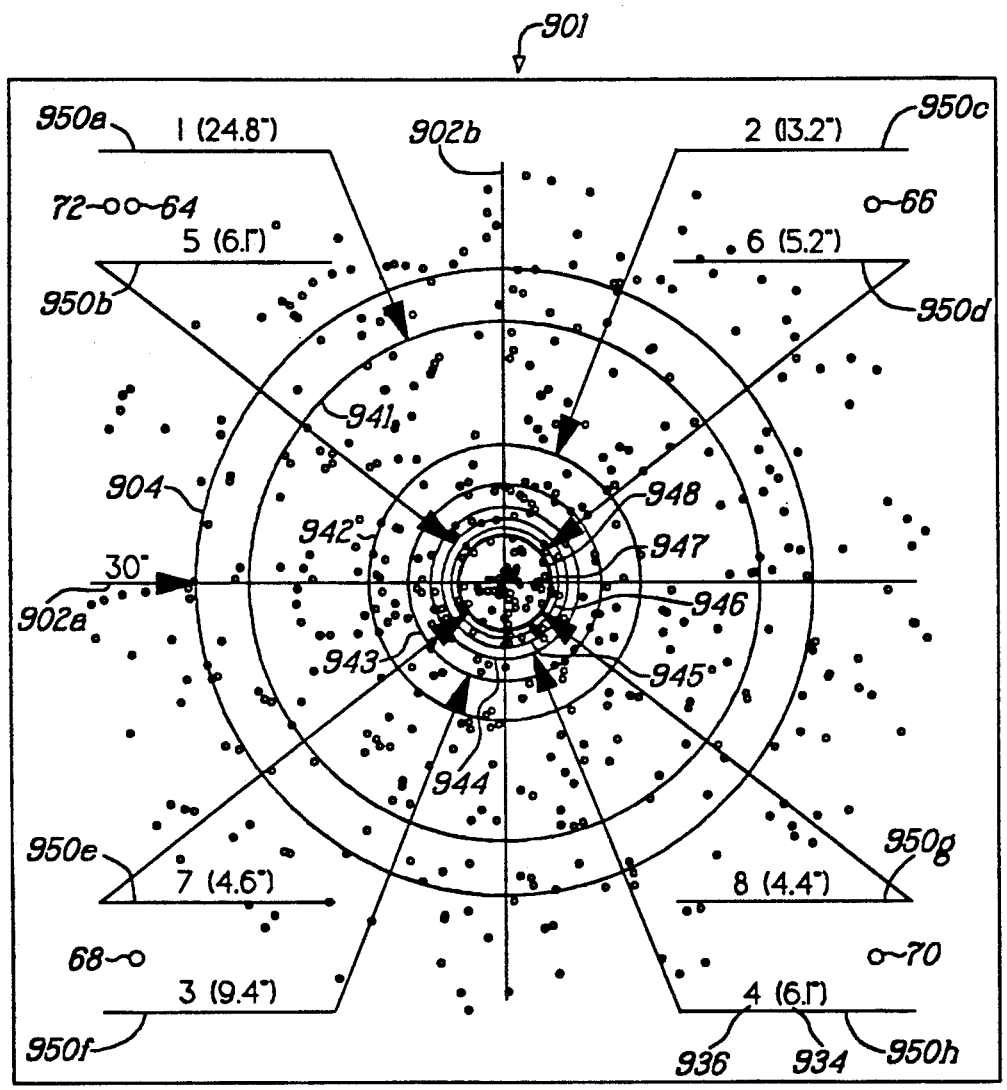

FIG. 15 shows an alternate presentation of density information. Instead of shading each 1 inch square, concentric circles are drawn which show average density of the pattern in terms of holes 906 per profile within each successive circle. The cross hairs 902a and 902b, and 30 inch circle 904 are shown for reference. The target profile is as defined above for FIG. 14. Circles 948, 947, 946, 945, 944, 943, 942 and 941 represent, respectively, 8 holes per target profile anywhere within that circle, 7 holes per target profile, 6 holes per target profile, 5 holes per target profile, 4 holes per target profile, 3 holes per target profile, 2 holes per target profile and, 1 hole per target profile. As is indicated in legend 950h (corresponding to circle 944) the first number referenced by numeral 936 indicates the number of holes per target (in this case it is 4) and the quantity in parenthesis 934 represents the diameter of the referenced circle (in this case circle 944 having a 6.1" diameter). Legends 905a-950g are similarly referenced.

To produce FIG. 15, the Report Generation Program 654 draws the 30 inch circle 904 and cross hairs 902 as before. Next, the polar coordinate data is analyzed in annular bands or rings of a fixed width (1½ inches in the preferred embodiment) and placed at all possible radial positions. For each band, the number of shot contained in the band is determined, the area of the band is calculated and an average density of shot per target profile area is also calculated. That value is compared with an arbitrary value of "interest", and if less, then a circle is drawn at that distance and a legend 950a-d is applied. For the preferred embodiment, the first interest value is 8 holes per target profile. The number of holes to be recorded on the printed report is decreased by some value (e.g., 1 in the preferred embodiment) to determine the next value of interest. The area inside each circle (948 through 941) contains at least the number of holes per target profile indicated in all smaller annular rings therein that were examined. It is possible, even likely, that some small rings farther out may have this density as well. The meaning of the chart is that all rings inside the given circle meet the density criteria. This examination of the polar coordinate data is continued until the average of 1 hole per target profile is found.

Figure 16:
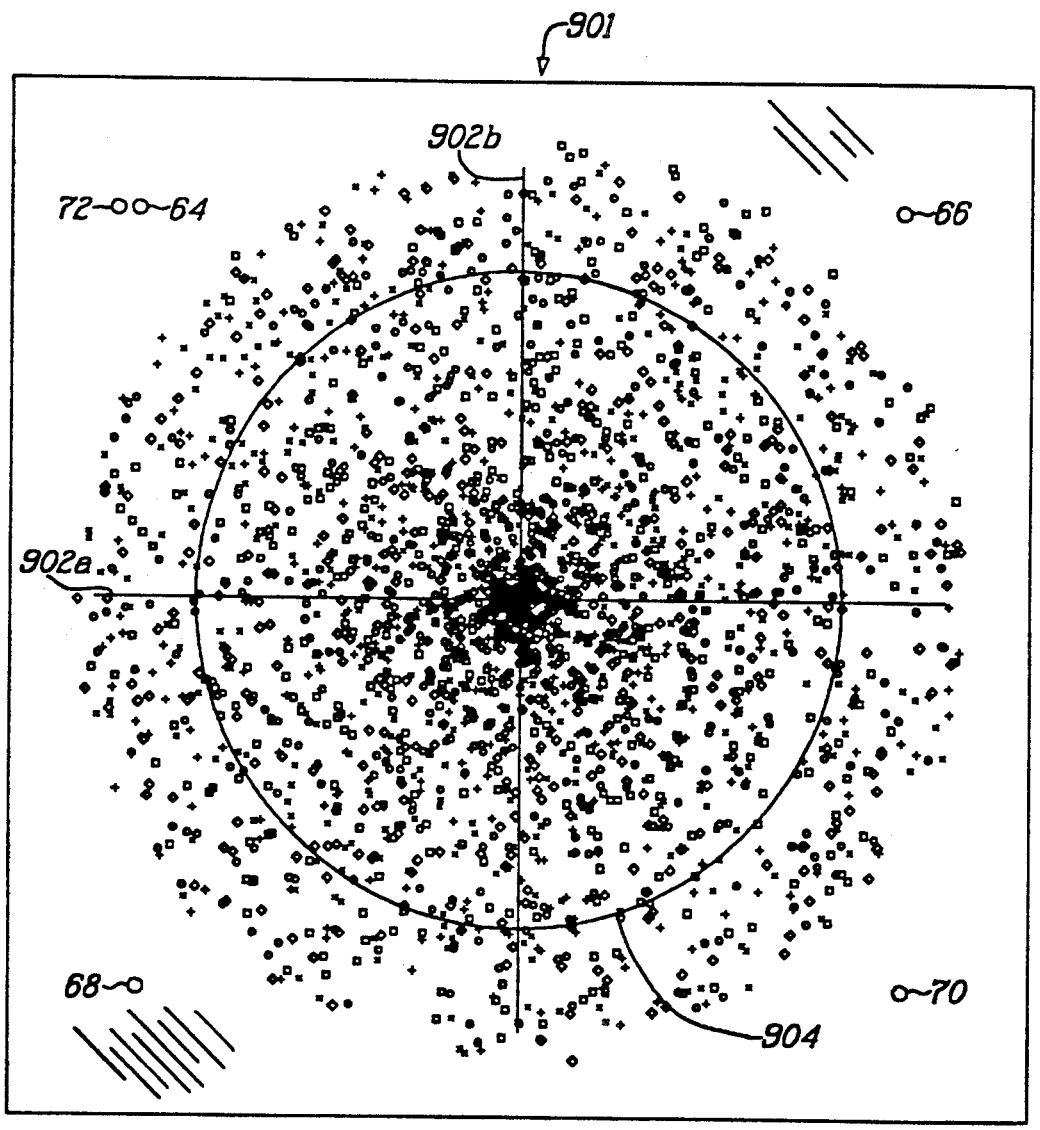

FIG. 16 shows an example of a multi-target presentation. FIG. 16 is similar to FIG. 12 in that shot holes are mapped onto the report as they are actually seen on the paper target. Again there are the reference indicators of cross hairs 902 and a 30 inch circle 904, but this time all the holes for 5 paper targets are overlayed and plotted on the same report. Each individual shot hole associated with a particular paper target is identified with a distinct symbol e.g. a diamond, an X, a +, a square, and a circle, respectively for the five paper targets.

To produce FIG. 16, the Report Generation Program 660 draws the 30 inch circle 904 and cross hairs 902 as in FIG. 12. This is followed by the drawing of X,Y data points for several paper targets on the same reference area. Each target's information is kept separate by providing a separate symbol for each target. This report is helpful in discovering systematic and consistent errors or variations in pattern densities in a family of targets. If a barrel throws oblong patterns, it will become more obvious with this report.

The above mentioned report formats are merely representative of a few of the different types of report formats that may be generated by the report generation program portion of this invention. Other formats can include overlays and side-by-side comparison charts so that systematic and/or consistent variations in pattern densities in pairs or families of targets can be detected. Another report format may include plotting a graph showing several targets that were shot, each at a different selected distance, and comparing shot percentage density at one or more circle diameters on each target. This information would be helpful to determine whether there are problems with the powder charge, shot charge or choke setting on a particular gun. Still other report formats can be generated to isolate particular variables associated with shotgun accuracy and target analysis, such as locating actual center of the pattern vs aim center of the target, i.e. the weighted center of impact vs the point of aim. The reports shown here represent accurate aim or correction for aim errors. The written report can describe in words that center of impact was "X" high right, etc.

OTHER APPLICATIONS OF THE PRESENT INVENTION

While the scanning and analysis aspects of this invention have been described with particular reference to shotgun pattern analysis as a teaching example, it is understood that several other fields may benefit by the scanning and analysis teachings disclosed herein. Such other fields include the following examples.

1) Continuous Process Monitoring. In this application the image folding apparatus 200 of FIGS. 1-3 can be placed so that it views a conveyor belt through its aperture 214 rather than the rotating drum 110 of the preferred embodiment. Objects on the travelling conveyor belt would pass the aperture 214 in a similar fashion to the way the shot holes along the paper target pass the slit by the motion of the revolving drum 110. That is, either system imparts relative motion to the image which aids in detection as described above. The resolution of the view of the small slice of the conveyor belt would be considerably enhanced over direct viewing by a conventional camera. A particularly useful application would be the identification, counting, grouping, etc. of small objects on a conveyor, for example. Another example would be traffic flow on highways, for example, flow past a particular point, intersection, overpass, etc.

2) Astronomical Image Analysis. The method of the preferred embodiment can be applied to the analysis of films (photographs, photostats, negatives, CCD imaging, etc.) taken of star clusters or like astronomical features in the cosmos. In this application, the film would be wrapped around the drum 110 of FIGS. 1 and 2 in the same manner as the patterning target 60 of FIG. 8 or the slit moved relative to a flat image display. Conventional density analysis techniques could be used to determine and evaluate the existence of new clusters, changes in star brightness, relative motion, etc. Also, the absence of bright material may be found by this method and may suggest locations of black holes, interstellar dust clouds, and other astronomical phenomenon.

3) Stereoscopic Vision. In this application, the rotating drum 110 would be removed. The target object to be viewed would be placed at some distance from the image folding apparatus 200 of FIGS. 1-3, and the primary mirrors 250, 252, 254, 256, 280, 282, 284, and 286 of FIGS. 3 and 4 would be adjusted to all cover the same area or region of a portion of the view field. Different angles of view (different perspectives) of the same scene would then be obtainable simultaneously. Even with moving targets, the recording of the image across the farthest extremes of mirrors, the target will have less than 0.000065 seconds to move (the time for one NTSC scan line). The differences in the view from the different areas of the screen (from different primary mirrors) can be used to compute distances and determine which objects are in front of others. This would have wide applicability in the field of Robot vision where a moving object is required to navigate around others. It can also apply to any guidance or homing process.

4) Fast Sampling. By aligning the primary mirrors as described above for Stereoscopic Vision and by rotating the video camera ninety degrees (90°) around its axis of view, and by placing the image folding apparatus 200 to minimize the effect of perspective, multiple samples of the same area can be had during the time normally devoted to one. A specific application might involve line calls in tennis matches. By pointing the apparatus 200 towards the service line and using six sets of primary and secondary mirrors (since the aspect ratio is now 8:6 or 4:3) would yield 360 images per second when using conventional television equipment in combination with the video camera 190. Even 100 mile an hour serves would travel less than 5 inches between images. It should be very easy to make accurate line calls. This could also be used to accurately call horse and car races where 1/60 of a second between successive image fields is too long.

5) Image Projection By use of the image folding apparatus 200 alone, and replacing the camera 190 with a projector, an image could be projected which has a much different aspect ratio than the original image. In particular, using the apparatus with 8 sets of mirrors would produce an image which was 48 times as wide as it is tall (or vice-versa) with no loss in clarity or resolution. A natural application would be to project a stacked display as a linear "crawler" such as stock market quotations or advertising spots, without having to produce large active displays which typically consist of lamps or LEDs (Light Emitting Diodes).

6) Medical or Industrial X-ray analysis The feature finding program 640 of FIG. 10 can be modified (minor changes in the code) to look for any number of special or particular shapes in addition to circular holes that represent shot holes on a target. Based on this, cracks in metal parts (such as pipe line welds) or bones (medical X-rays) may be detected. By setting the threshold value of the digitizer 500 (FIGS. 1, 6 and 10), any subtle changes in photographic density can be detected. Thus, areas of unusual density such as potential cancer sites in lung or breast X-rays can be discovered and displayed.

7) Aerial Photography/Remote Sensing Analysis. The feature finding program 600 of FIG. 10 can also be modified to look for lines or other features in a photograph. Thus, by scanning aerial photographs by use of this invention, the edges of reservoirs can be found and the present volume (content) can be calculated. Shadows can be identified and used to detect topographical features e.g. geographic, geologic or agricultural. Maps can be constructed directly from the photographs. With the appropriate filters on the original photographs, particular plants of interest can be identified. With a series of pictures taken several days or weeks apart, an analysis can be performed as to the maturity of growing crops based on density changes of the appropriate colors. Similarly the progress of construction projects could be analyzed. Satellite mounted systems, or ground based analysis of satellite taken images in accord with the principles of this invention permits remote sensing capability for weather, agricultural, and military applications 8) Traffic Analysis. By aligning each primary mirror of FIGS. 3 and 4 to view a single lane of traffic, many lanes of traffic can be monitored simultaneously on a single video image. The presence or absence of vehicles at any instant of time can be easily performed. Traffic density and speed in each lane can be calculated easily.

9) Panoramic Viewing/Security Systems. Multiple security cameras can be set up to produce a panorama of an area. By the system of this invention the views can be analyzed for movement or image detection, or by image projection (described above) the aspect ratio changed to give a uniform strip view.

It should be understood that various other modifications within the scope of this invention in addition to the above enumerated examples can be made by one of ordinary skill in the art without departing from the spirit thereof. For example, any number of image zones, more or less than 8 can be used, and rate of drum rotation (rate of relative motion) and scan rates may be used to vary resolution. I therefore wish my invention to be defined by the scope of the appended claims as broadly as the prior art will permit in view of the specification.

I claim:

1. Video signal digitizer comprising in operative combination:
   a) Analog signal processing means for receiving and processing input analog interlaced or non-interlaced scan line signals representing image information from a video camera;
   b) means for controlling said video signal digitizer state;
   c) means for transmitting output signals to a computer, said output signals comprising words of digital information representing at least some of said video image information;
   d) means for controlling video events providing signals to a means for control of scanning;
   e) means for control of scanning which includes a plurality of counters to provide output signals which:
      i) define by number digitizer stripes corresponding to position along a scan line;
      ii) track scan lines by number and
      iii) record the number of each video frame scan; and which scanning control means employs said sync signals from said analog means to control the advancing and resetting of said counters; said scanning control means providing said output signals to an output queue means;
   f) said analog signal processing means producing digital outputs to said video events controller means and said scanning controller means, said digital outputs including sync level, bright-spot signal output from said video camera, and a timed signal indicting vertical sync in progress;
   g) means for queuing output information;
   h) means for controlling placement of digital words of information in said output queue and for retrieval of said words from said output queue for transmission from said signal receiving and transmission means, said queue controller providing signals representing output queue status to said system state control means;
   i) said system state control means allowing or inhibiting scanning, transmission to the computer, performing reset functions, and responding to internal system conditions to change state to prevent error conditions; and..
   j) said digitizer checking image threshold and reporting image address, said address including video frame, video scan line, and position along said video scan line representing a digitizer stripe location, thereby permitting one-pass high resolution image verification, identification and location.

2. Video signal digitizer as in claim 1 wherein:
   a) said analog signal processing means functions in a bright-spot mode to detect above-threshold events.

3. Video signal digitizer as in claim 2 wherein:
   a) said analog signal processing means functions in an edge-detection mode, and
which includes:
   b) means for recording event history including a memory; and wherein:
   c) said scanning control means accessing said event history means to retrieve event history information for said event control means.

4. Video signal digitizer as in claim 1 which includes:
   a) means for display of the status of said system.

5. Video signal digitizer as in claim 4 wherein:
   a) said output queue means includes a ring buffer; and
   b) said queue control means includes a write counter and a read counter.

6. Video signal digitizer as in claim 5 wherein:
   a) six programmable array logic devices, PAL 1-6, are employed in said digitizer as follows:
      i) PAL 1 is disposed in said output queuing means and provides queue content signals including empty, full, and seven bits of non-linear Queue-Space-Remaining status;
      ii) PAL 2 is disposed in said video event control means, manages data in and out of said event history memory, and participates in edge detecting in that mode of operation;
      iii) PAL 3 is disposed in said scanning control means and filters the sync signals to cause counter resets to occur only at the appropriate times;
      iv) PAL 4 is disposed in said state control means, receives input from said operator switch device, said queue means and said a transmitting means, and maintains actual state conditions;
      v) PAL 5 is disposed in said transmitting means and multi-plexes various state information into at least a portion of twenty eight bits available for data in each block transmitted to the computer; and
      vi) PAL 6 is disposed in said transmitting means and controls the transmission of forty bit data blocks to said computer.

* * * * *